(12) United States Patent
Foster et al.

(10) Patent No.: US 10,860,746 B2
(45) Date of Patent: Dec. 8, 2020

(54) SYSTEM AND METHOD FOR PHYSICAL ONE-WAY FUNCTION AUTHENTICATION VIA CHAOTIC INTEGRATED PHOTONIC RESONATORS

(71) Applicant: THE JOHNS HOPKINS UNIVERSITY, Baltimore, MD (US)

(72) Inventors: Amy C. Foster, Sparks Glencoe, MD (US); A. Brinton Cooper, III, Bel Air, MD (US); Mark Foster, Sparks Glencoe, MD (US); Brian C. Grubel, Glen Burnie, MD (US)

(73) Assignee: The Johns Hopkins University, Baltimore, MD (US)

( * ) Notice: Subject to any disclaimer, the term of this patent is extended or adjusted under 35 U.S.C. 154(b) by 50 days.

(21) Appl. No.: 16/091,276

(22) PCT Filed: Apr. 7, 2017

(86) PCT No.: PCT/US2017/026547
§ 371 (c)(1),
(2) Date: Oct. 4, 2018

(87) PCT Pub. No.: WO2017/177105
PCT Pub. Date: Oct. 12, 2017

(65) Prior Publication Data
US 2019/0156066 A1    May 23, 2019

Related U.S. Application Data

(60) Provisional application No. 62/319,575, filed on Apr. 7, 2016.

(51) Int. Cl.
*G06F 21/72* (2013.01)
*G06F 21/34* (2013.01)
(Continued)

(52) U.S. Cl.
CPC ............... *G06F 21/72* (2013.01); *G06C 1/00* (2013.01); *G06F 21/34* (2013.01); *G06F 21/44* (2013.01);
(Continued)

(58) Field of Classification Search
CPC .......... G06F 21/72; G06F 21/45; G06F 21/34; G06F 21/44; G09C 1/00; G06C 1/00; H04L 9/001; H04L 9/3278
(Continued)

(56) References Cited

U.S. PATENT DOCUMENTS 6,088,450 A * 7/2000 Davis ................ H04W 12/0605
713/182
8,041,031 B2 * 10/2011 Gligoroski .............. H04L 9/065
380/28

(Continued)

FOREIGN PATENT DOCUMENTS

CN         101243513 A    8/2008
EP            2722191 B1   10/2012

OTHER PUBLICATIONS

Barclay, et al., Nonlinear response of silicon photonic crystal microresonators excited via an integrated waveguide and fiber taper. Opt Express. Feb. 7, 2005;13(3):801-20.
(Continued)

*Primary Examiner* — David J Pearson
*Assistant Examiner* — Badri Champakesan
(74) *Attorney, Agent, or Firm* — Johns Hopkins Technology Ventures

(57) ABSTRACT

A system and method is provided for a cryptographic primitive and authentication protocol comprised of micro-cavity resonators at optical wavelengths. A micro-cavity resonator is illuminated with an optical challenge signal and the cavity returns an output response that is dependent on the
(Continued)

input signal. Digital signal processing is performed on the output signal to generate a corresponding digital representation. This process is repeated for variations of the input signal with its digital output being stored in a database. A user or object claiming an identity presents a token to the system. The system selects a subset of the available challenge-response pairs and presents the challenges to the token. The system compares the digitized responses with the original responses expected for that token. The system will approve or deny the claimed identity corresponding to the presented token.

19 Claims, 31 Drawing Sheets

(51) Int. Cl.
| | | |
|---|---|---|
| G06F 21/44 | (2013.01) | |
| H04L 9/00 | (2006.01) | |
| H04L 9/32 | (2006.01) | |
| G09C 1/00 | (2006.01) | |
| G06F 21/45 | (2013.01) | |
| G06C 1/00 | (2006.01) | |

(52) U.S. Cl.
CPC .............. G06F 21/45 (2013.01); G09C 1/00 (2013.01); H04L 9/001 (2013.01); H04L 9/3278 (2013.01)

(58) Field of Classification Search
USPC ........................................................ 713/189
See application file for complete search history.

(56) References Cited

U.S. PATENT DOCUMENTS

| | | | | |
|---|---|---|---|---|
| 8,804,807 | B2* | 8/2014 | Liu .................... | H04B 7/18515 375/232 |
| 9,009,479 | B2* | 4/2015 | Carroll ............. | H04W 12/0609 713/169 |
| 2008/0141364 | A1* | 6/2008 | Skoric .................. | H04L 9/3234 726/20 |
| 2008/0149700 | A1* | 6/2008 | Tuyls ............... | G11B 20/00347 235/375 |
| 2008/0231418 | A1* | 9/2008 | Ophey ................... | G02B 27/00 340/5.85 |
| 2012/0242459 | A1* | 9/2012 | Lambert ............... | H04L 9/3271 340/10.3 |
| 2014/0072119 | A1* | 3/2014 | Hranilovic .......... | H04W 12/003 380/270 |
| 2015/0040247 | A1* | 2/2015 | Skoric .................. | H04L 9/3234 726/30 |
| 2015/0215115 | A1* | 7/2015 | Pikus .................... | H04L 9/0852 380/30 |
| 2016/0125682 | A1* | 5/2016 | Rapoport ............... | G01N 21/64 250/459.1 |
| 2016/0142409 | A1* | 5/2016 | Frei ..................... | H04L 63/0884 713/176 |

OTHER PUBLICATIONS

Pappu, et al., Physical one-way functions. Science. Sep. 20, 2002;297(5589):2026-30.
Pontkonjak, et al., Public Physical Unclonable Functions. Proc IEEE Aug. 2014;102(8):1142-1156.
Short, et al., Steps toward unmasking secure communications. Int J Bifurcation Chaos. 1994;04(04):959-977.
Noeckel, et al., Ray and wave chaos in asymmetric resonant optical cavities. Nature. Jan. 1997;385:45-47.
Galdi, et al., Wave propagation in ray-chaotic enclosures: paradigms, oddities and examples. IEEE Antennas Propag Mag. Feb. 2005;47(1):62-81.
Maqableh, et al., New Hash Function Based on Chaos Theory (CHA-1). IJCSNS. Feb. 2008;8(2):20-26.
Sicari, et al., Security, privacy and trust in Internet of Things: The road ahead. Computer Networks. Jan. 2015;76:146-164.
Horstmeyer, et al., Physical key-protected one-time pad. Sci Rep. Dec. 2013;3:3543.
Ruhrmair, et al., PUF modeling attacks: An introduction and overview. Des Autom Test Eur Conf Exhib. 2014.
Ruhrmair, et al., Optical PUFs Reloaded. 2013.
Goorden, et al., Quantum-secure authentication of a physical unclonable key. Optica. 2014;1(6):421-424.
Doya, et al., Speckle statistics in a chaotic multimode fiber. Phys Rev E Stat Nonlin Soft Matter Phys. May 2002;65(5 Pt 2):056223.
Sang, et al., Applications of two-photon absorption in silicon. J Optoelectronics and Adv Mater. Jan. 2008;11(1):15-25.
Turner-Foster, et al., Ultrashort free-carrier lifetime in low-loss silicon nanowaveguides. Opt Express. Feb. 15, 2010;18(4):3582-91.
Bosworth, et al., High-speed flow microscopy using compressed sensing with ultrafast laser pulses. Opt Express. Apr. 20, 2015;23(8):10521-32.
Uchida, et al., Fast physical random bit generation with chaotic semiconductor lasers. Nature Photonics. Nov. 2008;2:728-732.
Kanter, et al., An optical ultrafast random bit generator. Nature Photonics. 2010;4:58-61.
Fisher, et al., The test of time. Clock-cycle estimation and test challenges for future microprocessors. IEEE Circuits Devices Mag. Mar. 1998;14(2):37-44.
Stenner, et al., The speed of information in a 'fast-light' optical medium. Nature. Oct. 16, 2003;425(6959):695-8.
Gu, et al., Optical storage arrays: a perspective for future big data storage. Light: Science & Applications. May 2014;3:e177.
Ruhrmair, et al., Modeling attacks on physical unclonable functions. Proc 17th ACM Conf Comput Commun Secur. 2010.
Vijayakumar, et al., A novel modeling attack resistant PUF design based on non-linear voltage transfer characteristics. Des Autom Test Eur Conf Exhib. 2015:653-658.
Harayama, et al., Nonlinear Whispering Gallery Modes. Phys Rev Lett. May 1999;82:3803.
Grubel, et al., Secure Authentication using the Ultrafast Response of Chaotic Silicon Photonic Microcavities. CLEO; Jun. 2016.
Grubel, et al., Information-Dense Nonlinear Photonic Physical Unclonable Functions. 2017.
Helfmeier, et al., Cloning physically unclonable functions. IEEE. 2013: 1-6.
Nedospasov, et al., Invasive PUF Analysis. 2013 Workshop on Fault Diagnosis and Tolerance in Cryptography. Oct. 2013:30-38.
Altmann, Emission from dielectric cavities in terms of invariant sets of the chaotic ray dynamics. Phys Rev A. Jan. 2009;79:013830.
Altmann, et al., Leaking chaotic systems. Rev Mod Phys. May 2013;85:869.
Hagness, et al., FDTD microcavity simulations: design and experimental realization of waveguide-coupled single-mode ring and whispering-gallery-mode disk resonators. Journal of Lightwave Technology. Nov. 1997;15(11):2154-2165.
Redding, et al., Evanescently coupled multimode spiral spectrometer. Optica. 2016;3(9):956-962.
Barclay, P., "Nonlinear response of silicon photonic crystal microresonators excited via an integrated waveguide and fiber taper" Optics Express, Feb. 7, 2005 / vol. 13, No. 3, pp. 801-820.

* cited by examiner

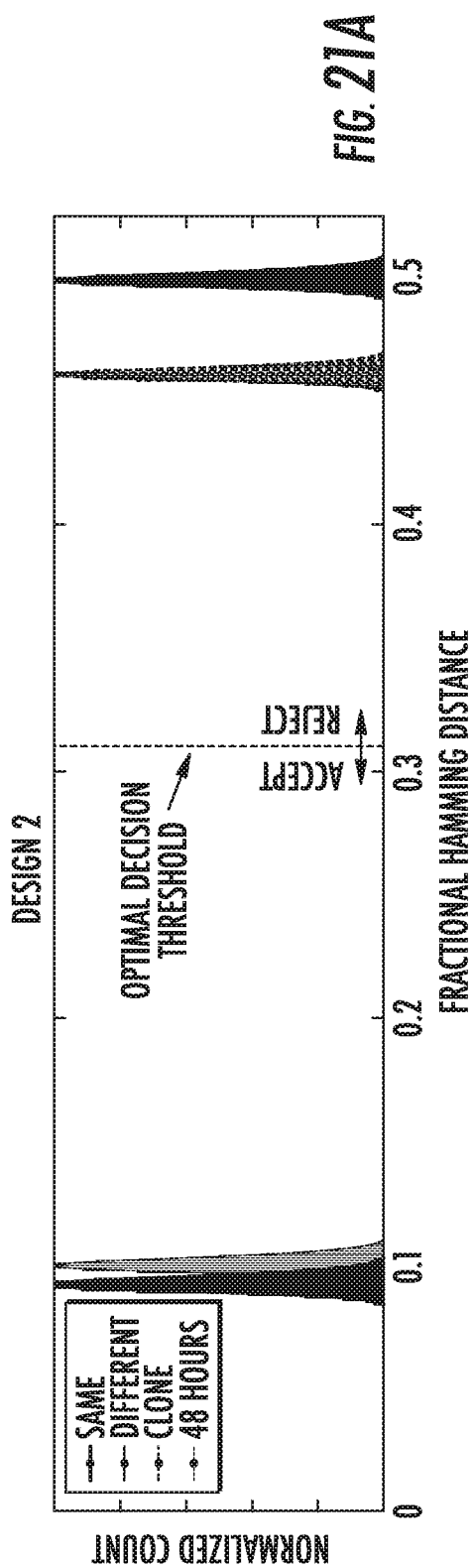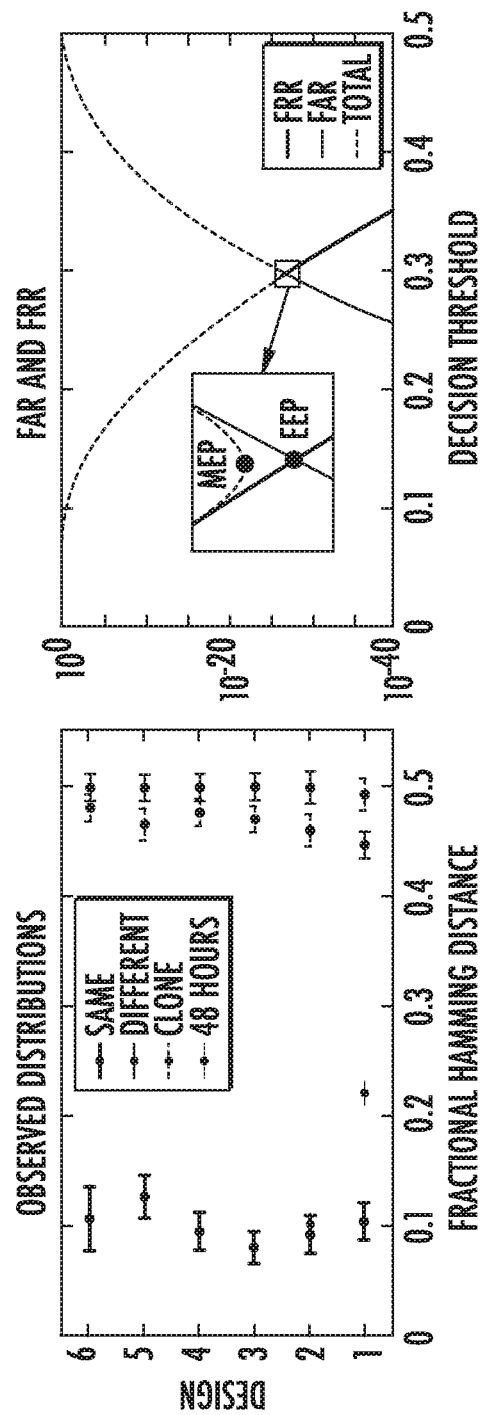
FIG. 21A
FIG. 21B
FIG. 21C

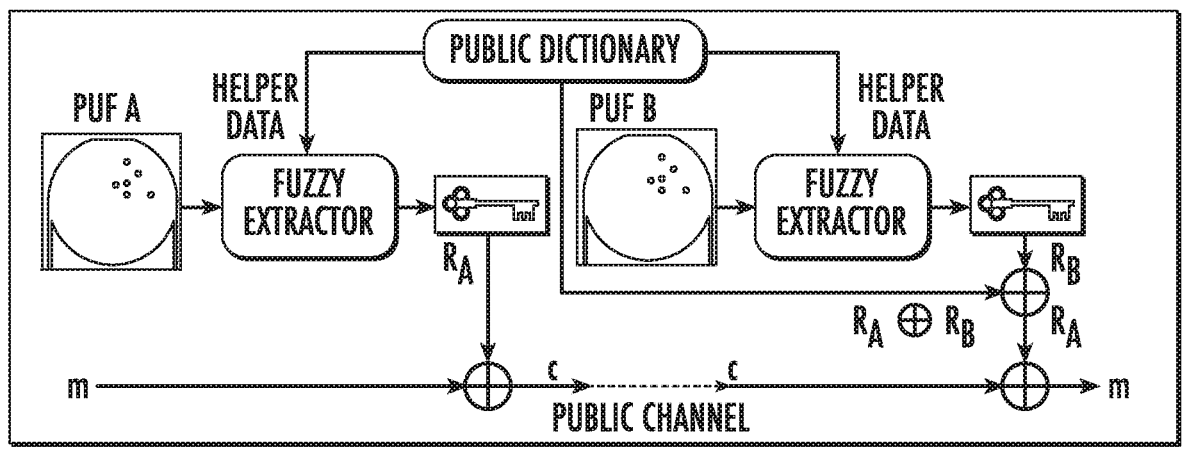
FIG. 23A
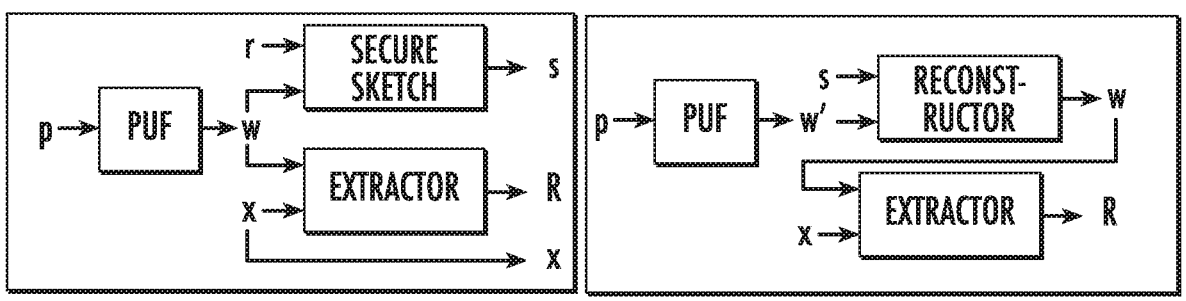
FIG. 23B
FIG. 23C

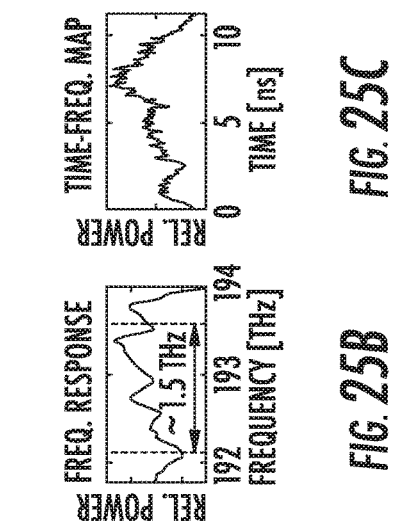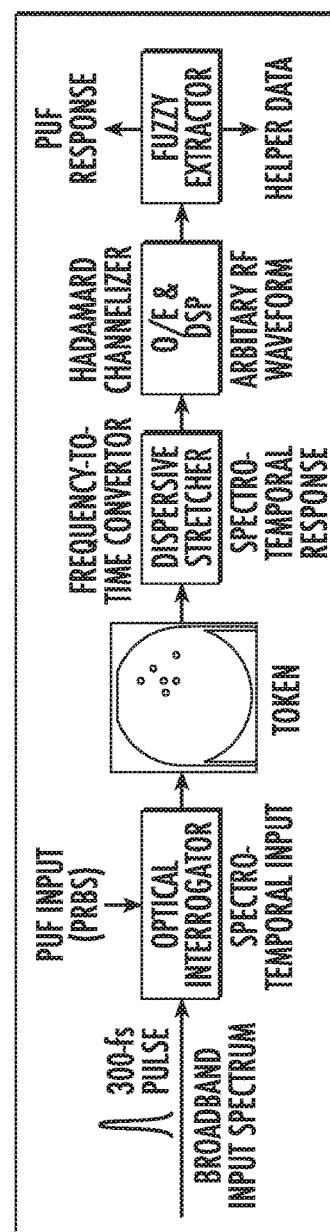
FIG. 25A
FIG. 25B
FIG. 25C

SYSTEM AND METHOD FOR PHYSICAL ONE-WAY FUNCTION AUTHENTICATION VIA CHAOTIC INTEGRATED PHOTONIC RESONATORS

CROSS-REFERENCE TO RELATED APPLICATIONS

This application is a 35 U.S.C. § 371 U.S. national entry of International Application PCT/US2017/026547, having an international filing date of Apr. 7, 2017, which claims the benefit of U.S. Provisional Application No. 62/319,575, filed Apr. 7, 2016, the content of each of the aforementioned applications is herein incorporated by reference in their entirety.

FIELD OF THE INVENTION

The present disclosure relates generally to the fields of information assurance, integrated photonics, and optical communications. Specifically, integrated photonic devices can be used to construct Physical One-Way Functions (POWFs) and Physically Unclonable Functions (PUFs) for use as cryptographic primitives to provide confidentiality, integrity, and authentication in a variety of applications.

BACKGROUND OF THE INVENTION

Although the past four decades have seen unprecedented growth in the influence of cyberspace at every level of life from the huge corporation and government to the child with a new smartphone, onset the era of the Internet of Things provides new challenges for information security. Devices, databases, accounts, and especially personal identities are vulnerable to theft, sabotage, denial of access, and destruction. Nearly all the protective mechanisms currently in place rely on some sort of algorithmic or computational (and therefore, vulnerable) security schemes.

A transformative solution is vital to protecting all the devices coming online (and those that have not yet been invented) and to all the assets that they otherwise make vulnerable. Key-enabled mathematical security algorithms are implemented in electronic digital circuits for applications such as authentication and encryption; these algorithms use cryptographic primitives that are generated by algebraic or number-theoretic algorithms and may include hash functions, random sequences, one-way permutations, and other ciphers as well as keys. Such methods are often complex and slow (compared with the speed necessary to foil an "over the shoulder" capture of a secure sequence) and use weak keys that are easily cloned or predicted. Keys are frequently stored in unsecure, random access memory that requires large portions of chip area and continuously applied power to keep the key memory active.

Such algorithms often use computationally asymmetric methods for encoding (hiding) and decoding (revealing) unique information relative to a user or object; examples include forming the product of two very large primes or exponentiation of a base number by a large prime number (easy) vs. factoring a large composite number or taking the discrete logarithm of a large number, respectively (difficult). The security of such "one way" functions has never been rigorously proved and is, in any case, not absolute. The factoring and logarithm functions required to break these codes are merely difficult, but they are not impossible. Further, emerging and pending successes of large parallel computers and quantum computers in cracking asymmetric algorithms are not encouraging for the continued success of cryptographic one way functions.

Therefore, it would be desirable to have a system and method that can provide secure authentication that cannot be easily subverted nor is vulnerable to the same issues present in modern cryptographic primitives.

SUMMARY OF THE INVENTION

The foregoing needs are met, to a great extent, by the present invention, wherein in one aspect system provides physical layer security using silicon micro-cavity devices to produce difficult to predict, difficult to clone, chaotic pulse waveforms from which quasi-random binary sequences suitable for challenge/response authentication and for encrypted communications are deterministically obtained.

When a short (sub-picosecond (sub-ps)) light pulse is coupled into a silicon micro-cavity, the inherent nanometer scale sensitivity of the highly confined devices and the rich, complex, modal structure of guided optical radiation together generate this pulse waveform, the features of which can vary significantly with slight changes in initial conditions, thereby exhibiting chaotic behavior.

Waveform quantization, processing, and analog to digital (A/D) conversion schemes for extracting binary sequences from the cavity output obtain strong sequences when measured against statistical randomness tests and information theoretic security principles. The cavities themselves are entirely passive and fabricated using standard silicon microelectronic fabrication methods, making them both extremely compact (<0.01 mm$^2$) and inexpensive.

In one embodiment, the A/D conversion is performed on the time-domain lightwave output of the cavity. In another embodiment, the system is based upon spectral phase and/or amplitude encoding of the input pulse, nonlinear interactions within the cavity, and interactions with a dynamic spectrally encoded filter that is detected with a photodiode. The A/D conversion process is performed on the series of subsequent power samples in time.

This scheme for generating quasi-random binary keys for a variety of cybersecurity applications rests on deriving a "key" from the chaotic nature of a guided optical wave producing hundreds of radiation modes as it reflects from various features within the micro-cavity. A narrow optical pulse (~100 femtoseconds (fs)) propagating through a silicon photonic micro-cavity is imprinted with the unique "fingerprint" formed by a combination of the natural and engineered randomness of the cavity surfaces and the random tolerances offered by semiconductor manufacturing processes.

Thus, an attempted cloning of the device would not produce an output pulse that is identical to the original, showing that the device is non-reproducible. The uncloneability of these waveforms makes modeling of the wave dynamics within the micro-cavity impossible.

Furthermore, unlike previous work in this area, this approach provides an ultrafast response in <100 ps further challenging attempts to clone the response due to the inherent latency of such cloning approaches.

In accordance with an embodiment of the present invention, a system for a cryptographic primitive which is deployable in a cryptographic system includes an authentication token which defines a resonator cavity. The system also includes an authentication terminal. The authentication terminal submits challenge pulses to the authentication token and records a response, and wherein the authentication terminal verifies the response with an expected response.

The system leverages the chaotic behavior of integrated photonic cavities to create a repeatable but complex output, is constructed on a silicon wafer, is of shape and form that creates complex behavior with optical input, has one or more over-coupled or evanescently coupled bus waveguides for transmission and emission; and responds to high-power illumination in a way that leverages nonlinear effects within the device which contribute to the complexity of the output. The challenge pulses can be compressed and spectrally phase and/or amplitude encoded and high power to operate within the nonlinear regime of the cavity. The authentication terminal takes the form of a highly non-linear fiber. A polarization state may be used as a factor in developing challenge response pairs. A latency of an optical response is used in the verification process. The response to a challenge to a cavity is amplified and looped back into the input of the cavity zero or more times. An A/D detection process interpolates sampled responses with a cubic filter and uses a peak finding algorithm to identify the response locations, uses an optimization algorithm to determine the ideal integration window about the peak point to maximize SNR calculates integrated power measurements based upon the ideal integration window calculates the Probability Density Function (PDF) of the sampled integrated powers and requantized the points into non-uniform levels which flatten the resultant PDF selects k Least Significant Bits (LSBs) from each sample appends the resultant bits into a single bit stream. The system includes a reverberant silicon photonic cavity. The system includes a spectral filter.

In accordance with an aspect of the present invention, a method for a cryptographic primitive which is deployable in a cryptographic system includes submitting challenge pulses to an authentication token which defines a resonator cavity using an authentication terminal. The method includes recording a response to the challenge pulses and verifying the response to the challenge pulses by comparing the response to an expected response.

In accordance with yet another aspect of the present invention, the method includes leveraging the chaotic behavior of integrated photonic cavities to create a repeatable but complex output. The method includes responding to high-power illumination in a way that leverages nonlinear effects within the device which contribute to the complexity of the output and compressing the challenge pulses, wherein the challenge pulses are spectrally phase encoded and high power to operate within the nonlinear regime of the cavity. The method includes using a highly non-linear fiber. The method includes using a polarization state as a factor in developing challenge response pairs. The method includes using an optical response in the verification process. The method includes amplifying and looping back the response to a challenge to a cavity into the input of the cavity zero or more times. Further the method includes an A/D detection process interpolating sampled responses with a cubic filter and uses a peak finding algorithm to identify the response locations, using an optimization algorithm to determine the ideal integration window about the peak point to maximize SNR calculates integrated power measurements based upon the ideal integration window calculates the Probability Density Function (PDF) of the sampled integrated powers and requantized the points into non-uniform levels which flatten the resultant PDF selects k Least Significant Bits (LSBs) from each sample appends the resultant bits into a single bit stream. The method can also include using a spectral filter.

BRIEF DESCRIPTION OF THE DRAWINGS

The accompanying drawings provide visual representations, which will be used to more fully describe the representative embodiments disclosed herein and can be used by those skilled in the art to better understand them and their inherent advantages. In these drawings, like reference numerals identify corresponding elements and:

FIGS. 21A-21C illustrate graphical views of experimental authentication results.

FIG. 23A illustrates a schematic view of a fuzzy extraction PUF communication protocol.

FIG. 23B illustrates a schematic view of a generation procedure.

FIG. 23C illustrates a schematic view of a reconstruction procedure.

FIG. 25A illustrates a schematic view of photonic PUF with time-stretched fuzzy extraction. FIG. 25B illustrates a graphical view of a frequency response from un-patterned pulse via optical spectrum analyzer. FIG. 25C illustrates a graphical response of the same response measured by time-stretched detection.

DETAILED DESCRIPTION

Figure 1:
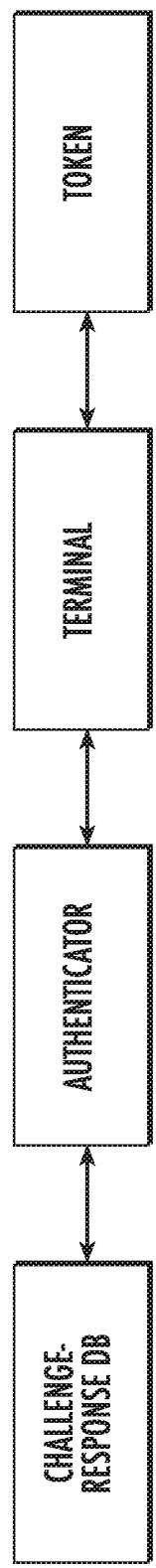
FIG. 1 illustrates a basic system block diagram.

The presently disclosed subject matter now will be described more fully hereinafter with reference to the accompanying Drawings, in which some, but not all embodiments of the inventions are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Drawings. Therefore, it is to be understood that the presently disclosed subject matter is not to be limited to the specific embodiments disclosed and that modifications and other embodiments are intended to be included within the scope of the appended claims.

The implementations described herein are directed to methods and systems for information assurance including, but not limited to, authentication protocols, pseudo-random number generation or key derivation, integrity verification, password verification, file or data identification, proof-of-work systems, etc. As used herein, the term "communications system" refers to a hardware architecture (hardware components) and a software framework (software components), including application frameworks, that enable software, to operate a communications network and the security controls present therein. As used herein, the term "adversary" refers to a malicious external actor who attempts to gain access to this communications system by circumventing the present security controls. Should such access be granted, they may result in destruction, disclosure, modification of data, and/or denial of service. Implementations are described herein with reference to computing devices and communications systems. As used herein, a computing device may include an end-user device, embedded devices, or network architecture elements that are configured to leverage the authentication systems described herein. As used herein, an authentication "token" is the complete device containing the integrated photonic micro-cavity used for interacting with the authentication protocol. In addition, a "challenge" is a collection of one or more parameters that form a unique input to the token. Further, a "challenge session" is a collection of one or more challenges that form the requisite number of transactions to verify the legitimacy of the token. As used herein, the term "phota" represents the random-like, possibly chaotic, optical waveform generated in response to a challenge stimulus of the cavity.

Two important uses of photas and phota-derived keys are authentication and communication. Authentication is the means by which one party certifies its identity to a second party who controls access to a protected resource. Identity can be expressed as a digital signature or as a phota possessed by the one seeking access. The second party issues a challenge in the form of a stimulus signal, and the applicant responds with its signature, the two constituting a challenge-response pair (CRP). If the response is found to be authentic, access is granted. The phota (response) is likely to be distinct for distinct optical challenge pulses so many CRPs may be possible. For cavity primitives, the input pulse represents the challenge, and the phota produced in response to the challenge or a sequence derived from the phota is the response.

In secure communication, information is encrypted to prevent an eavesdropper from obtaining it via physical access to the channel or by capturing the received transmission. Encryption by the XOR operation of a long binary sequence (code or cipher) to the information is well known and widely used, but communication remains increasingly vulnerable to unauthorized deciphering, as the capabilities of computers grow faster than the strength of the encryption key. The physical layer primitives discussed in this invention afford two methods for information encryption that is virtually impossible to decipher. In the first embodiment, a pseudorandom sequence is obtained from the sequence of phota values as explained earlier and used as a session key. In the second embodiment, one can integrate the sequence of phota values to obtain a continuous pulse to function as a communication symbol (modulation pulse) to convey, e.g., bipolar {±1} data. In the receiver, time-reversal (a form of matched filtering) is used to collapse the phota to an estimate of the original pulse, and observe its sign.

FIG. 1 illustrates s a block diagram of a basic authentication system used to verify the claimed identity corresponding to a presented token. In one embodiment, a user is in possession of an authentication token, which interacts with the authentication protocol. The user would first claim an identity, perhaps by submitting a username to the system and a unique identifying number from the token. In another embodiment, a computing device has an authentication token embedded in the computing device, either by a removable method or direct fabrication onto internal electro-optic components, e.g. printed circuit boards and the like. For the latter embodiment, the system would also claim an identity by providing unique identifying information corresponding to the installed token.

In standard operation, a token is first run through an enrollment phase where many challenges are presented to the token and their responses (after processing) are stored in an authentication database. The keys are then distributed to the end-users (or for installation to computing devices) with specific requirements on shipping times to mitigate the risk that devices are characterized in transit. Once a user receives the token, the user may authenticate to the authenticator. The user first claims an identity to the authenticator then the authenticator chooses one or more Challenge/Response pairs (CRPs) from the CRP DB to form a challenge session. The authenticator presents the challenges to the token and calculates the response. The authenticator calculates the deviation of the actual response to the expected response. If the deviation is lower than the authentication threshold, then the token is verified as genuine, otherwise the token is determined to be non-genuine.

Figures 2A, 2B, 2C, 2D:
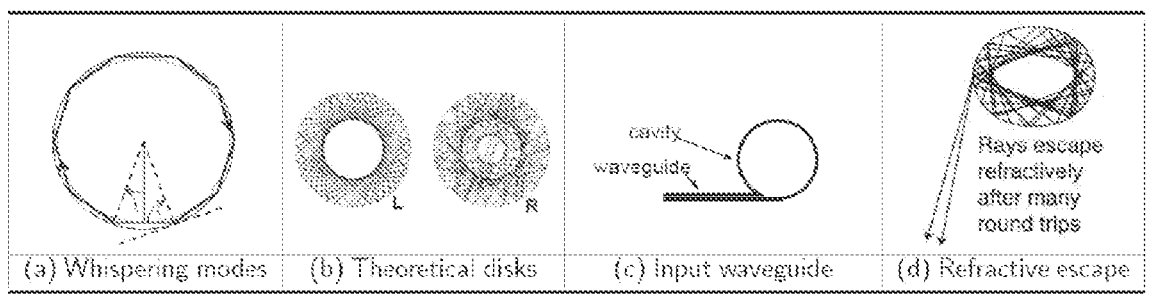
FIG. 2A-2D illustrates a various types of dielectric resonators and light propagation therein.
Figure 2F:
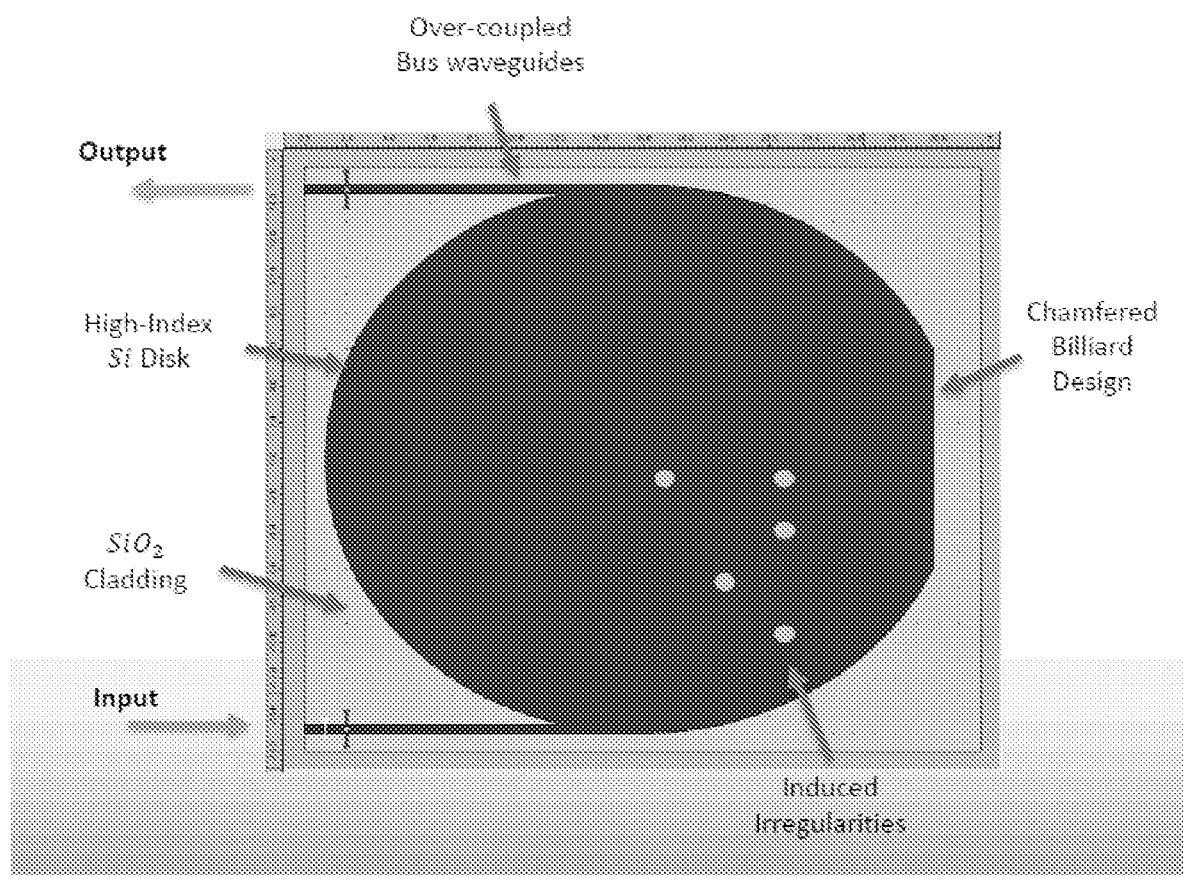
FIG. 2F illustrates a typical device geometry with several labeled features.

Light is coupled into a sub-micron thick, perfectly circular, transparent disk-shaped silicon micro-cavity that is surrounded by dielectric. When the wavelength λ of the light is much smaller than the disk radius R, light propagation within the disk is well modeled by straight lines (rays) that are parallel to the cavity floor and incident on the vertical boundary (wall). A ray intersects the wall at incidence angle $\theta_i$ from the normal to the wall and is reflected at angle $\theta_i = \theta_r$, thence moving around the cavity colliding with the wall and reflecting at the same angle. In the ideal case of lossless propagation, the paths traced by the rays continue indefinitely around the cavity in what are called "whispering gallery modes (WGMs)," (named for a similar phenomenon for sound waves first observed in St. Paul's Cathedral, London) as displayed in FIG. 2A. When the incidence angle exceeds a so-called critical angle $\theta_c = \sin^{-1}(n_{ci}/n_{co})$, where $n_{ci}$ and $n_{co}$ are refractive indices of the cladding and the silicon cavity, respectively), light escapes from the cavity by a radiative process causing the rays to avoid a central circular region defined by an envelope called the caustic (FIG. 2B). The theoretical construct, of FIG. 2A, provides no physical means to introduce a light pulse into the cavity, so an optical waveguide is fabricated as part of the micro-cavity itself (FIG. 2C). This introduces a surface discontinuity, as shown, that destroys the perfect symmetry of the cavity, disturbing the whispering gallery modes, and leading to highly irregular ray paths shown in FIG. 2B. More importantly, the surface discontinuity helps to drive the rich modal structure that is responsible for the chaotic behavior of the optical wave. In the theory of dynamical systems, such a disk as FIG. 2A is an example of a mathematical billiards, defined as a domain in the plane (the billiard table) and a point mass (the billiard ball) that moves at constant speed, repeatedly reflecting from the boundary at an angle determined by Snell's Law. (Note that since billiard balls do not leak evanescently through the sides of the table, there would be no caustic on a physical billiards table.)

The disk of FIG. 2B, with a chamfer of 0.01 R has been observed to give rise to ray-chaotic behavior. Chaotic waveforms are those that may differ by a small amount in their initial trajectories but that ultimately diverge exponentially. In these cases, a decay process known as refractive escape (FIG. 2D) causes a ray to diffuse chaotically and exit the cavity. Something as simple as a loss of cavity symmetry or the chamfer of FIG. 2B can cause chaotic orbits. Many other billiard table shapes will cause chaotic orbits as well. However, whether the outputs of physical primitives are called "chaotic," "pseudorandom," "one-way," "uncloneable," or "randomlike," the simple need is for primitives that are difficult or impossible to copy, reproduce, invert, or predict and that generate sequences that are virtually impossible to predict.

Figure 4:
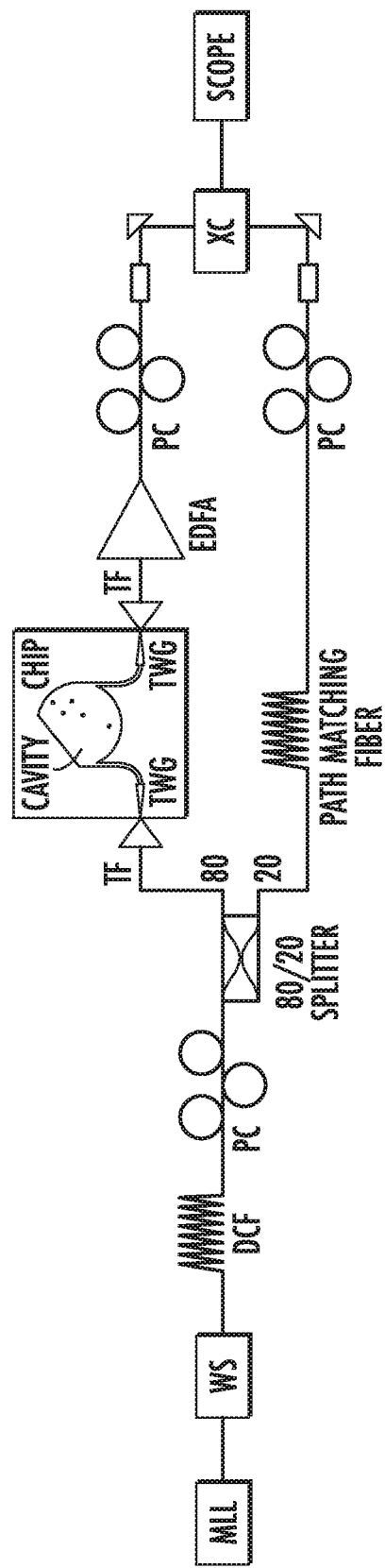
FIG. 4 illustrates one embodiment of a time domain measurement of the system.
Figure 5:
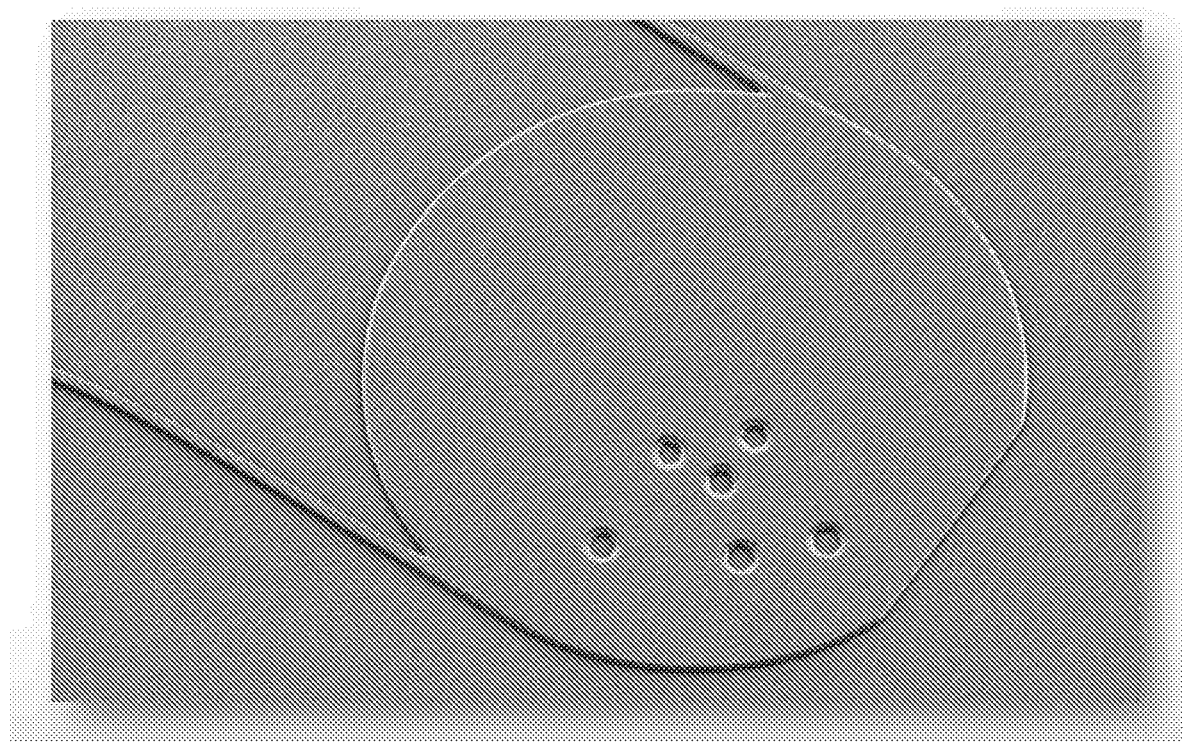
FIG. 5 illustrates a Scanning Electron Microscope image of a prototype device.

Simulated photas and their experimental counterparts are shown in FIG. 4. The narrow input pulse (~100's of fs) is transformed into a phota of a longer duration (approximately ps), which is the functional equivalent of unique fingerprint of the cavity. Because energy is lost throughout the reverberations of the optical pulse within the cavity due to transmission at its boundary, the energy in the phota is less than the input pulse energy.

Attempts to reverse engineer such a cavity, even with complete information regarding its design geometry, can result in incomplete reconstruction. Nano-scale structural variations of the cavity, some of which are due to manufacturing tolerances, render the device uncloneable. In addition, the micro-cavity is tamper-proof, because any attempt to modify or measure its nano-scale nuances would just destroy it; even a scanning electron microscope (SEM) cannot properly characterize the randomizing features of the cavity wall. Small change to the input pulse will result in an observably distinct phota and the resulting binary sequences, giving further evidence of chaotic behavior.

Figures 3A, 3B:
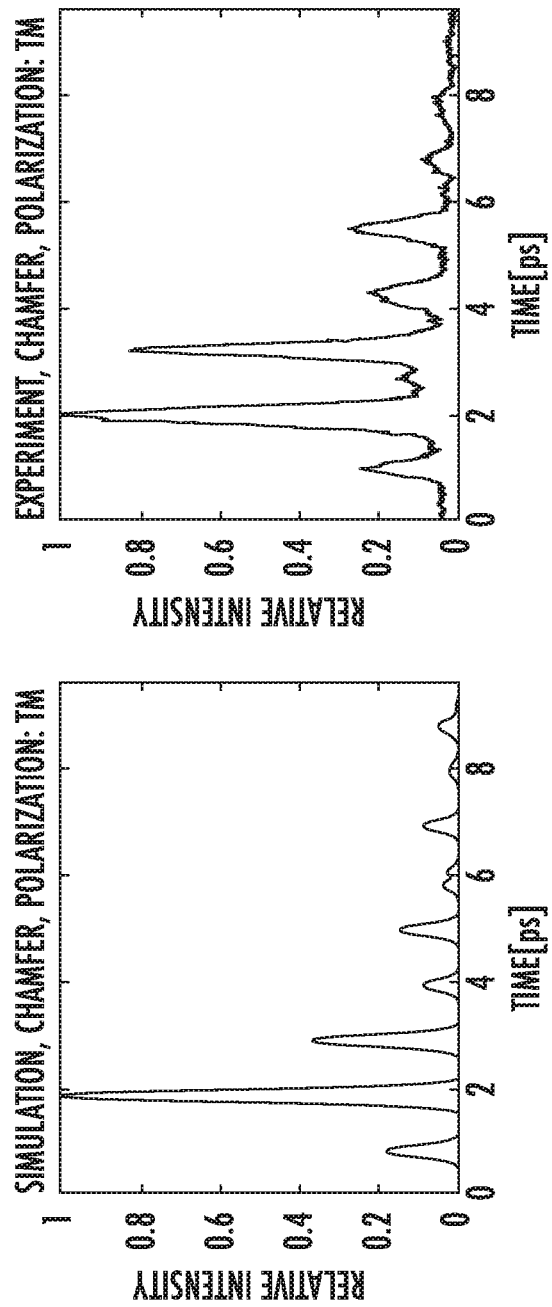
FIG. 3A illustrates a typical photo in the time domain from Finite Element Time Domain (FETD) simulation for the Transverse Electric (TE) polarization state.
FIG. 3B illustrates the corresponding photo measured from experiment.
Figure 6:
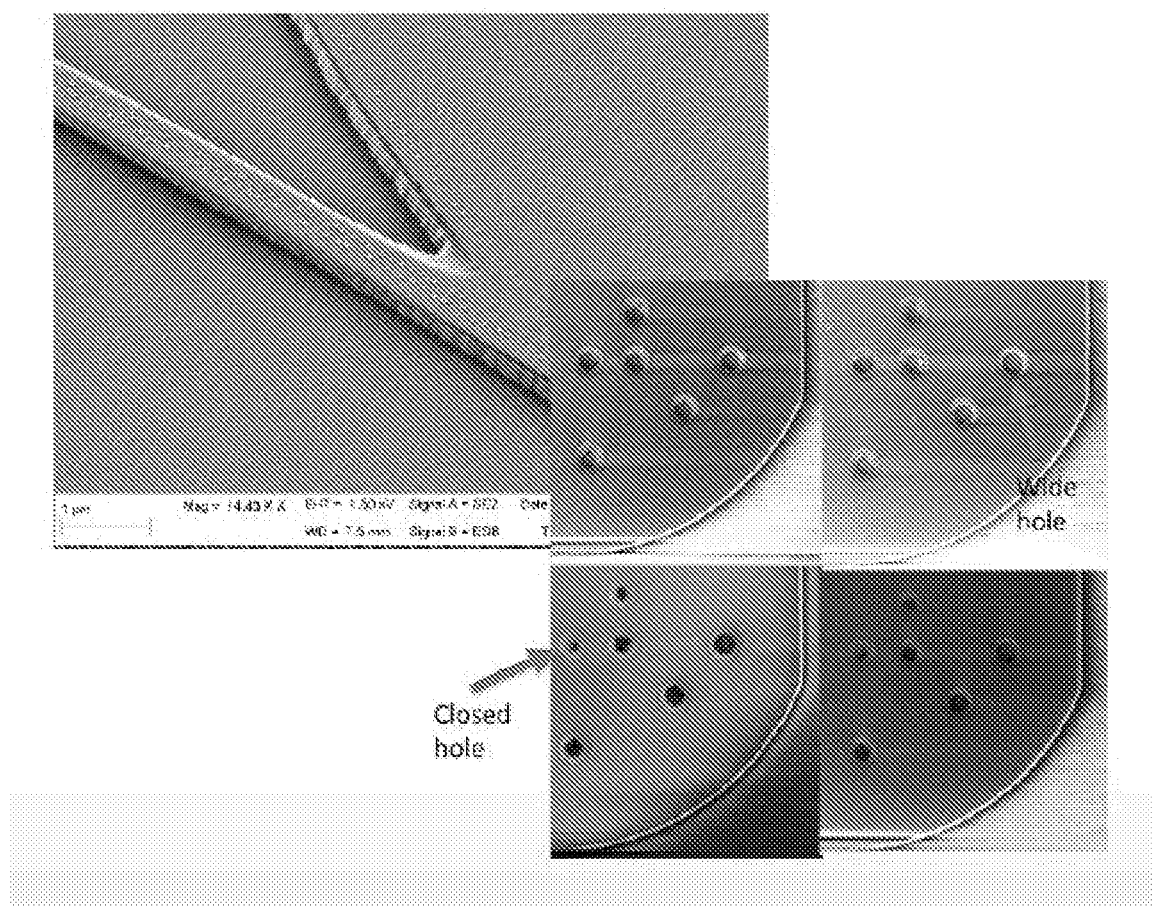
FIG. 6 illustrates a SEM image of the prototypes with special focus on the fabrication variance of the devices that aid in the unclonability of the system.
Figure 7:
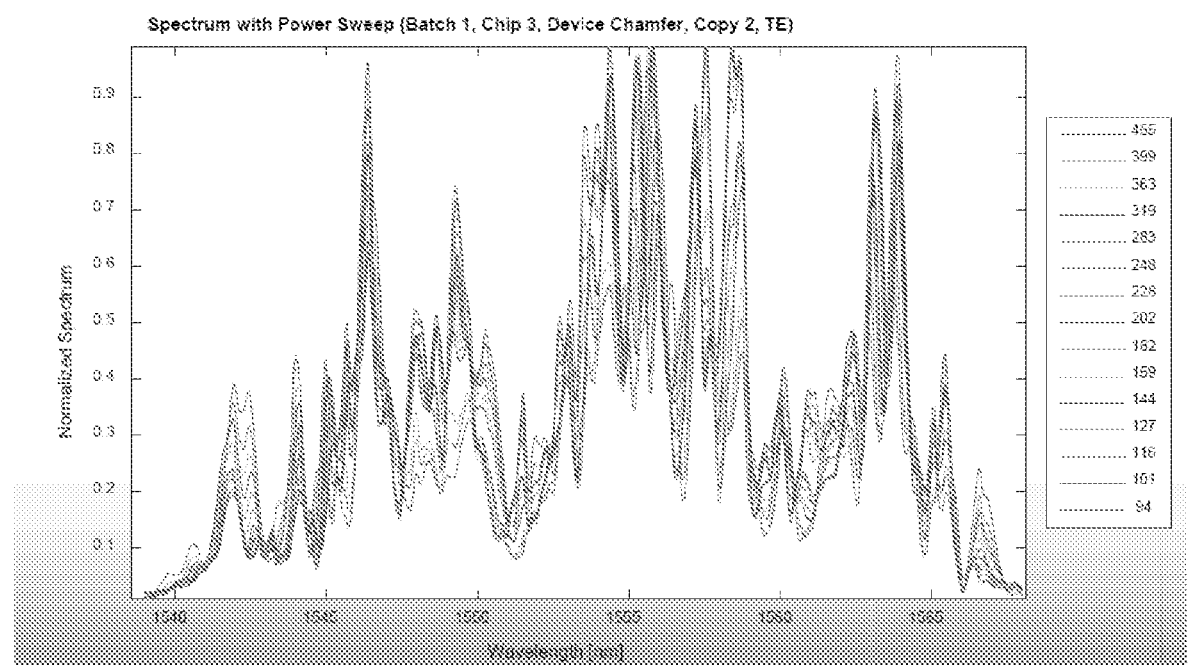
FIG. 7 illustrates a typical output spectrum of the device with a nonlinear power dependency.
Figure 8:
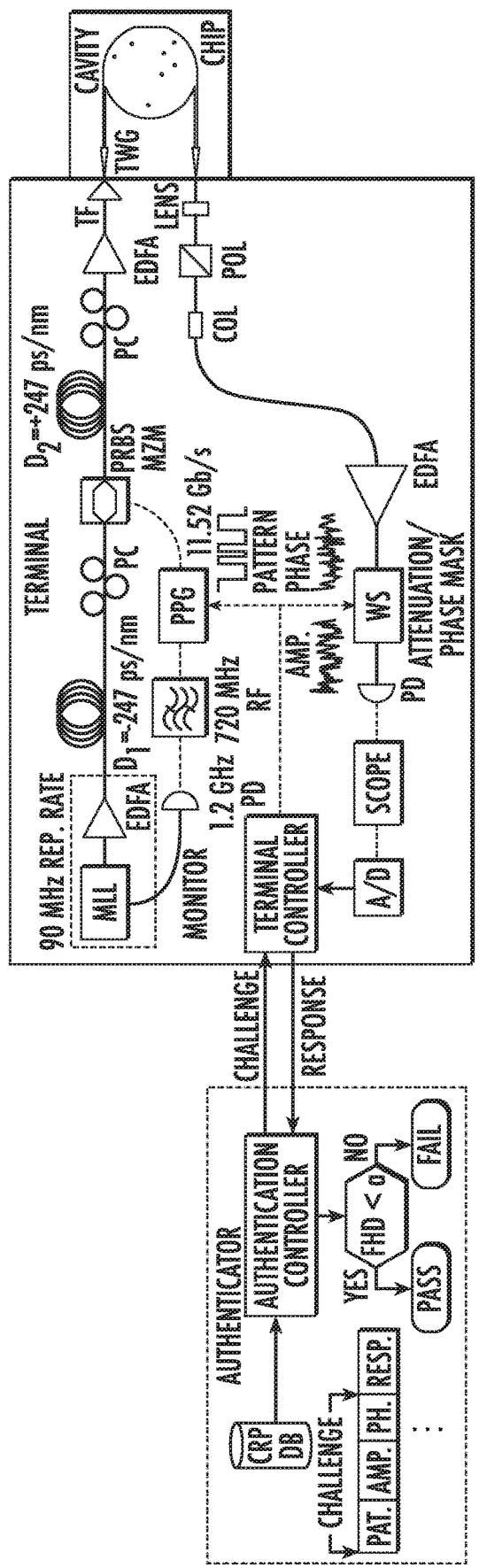
FIG. 8 illustrates an embodiment of a challenge-response configuration.

FIG. 3 illustrates a typical device geometry used within the authentication token. This embodiment of the device shows a reverberant, optical micro-scale cavity, configured as a crystalline silicon disk clad with $SiO_2$, using standard CMOS fabrication techniques. FIG. 6 shows an SEM image of a preliminary prototype device with a chamfer of length 0.8 R and several small diameter islands of cladding material within the cavity, as well as two discontinuities where the bus waveguides join to the cavity. Such asymmetries and discontinuities enhance the random-like light scattering within the cavity, as do nano-scale, manufacturing-induced, non-reproducible and non-predictable irregularities in the cavity surface.

Manufacturing tolerances may be large with respect to the minimum cell resolution $\lambda^3$ of the light. The most significant source of randomness and chaos is the rich structure of the propagation modes of the optical excitation. Within a device or structure such as waveguide (e.g., fiber optic cable), a mode is a self-consistent electric field distribution that arises due to constraints imposed by the boundaries of the structure. Depending upon the structure, the number of modes can grow to a very large number, and the distributions can look quite complicated. Asymmetries and discontinuities in the guiding structure, such as the chamfer or the sharp discontinuity where waveguides join the cavity can give rise to complicated modal distributions as well, and these surely contribute to the random-like, perhaps chaotic, nature of the paths through the cavity and the output photas.

In one embodiment, for a single challenge response pair, the key enrollment and provisioning phase begins by sending an ultrashort pulse into the cavity. The pulse is guided via a rectangular bus waveguide to the over-coupled cavity interface, where the light reverberates within the cavity. The phota exits the cavity and is guided by an output rectangular waveguide. This phota is cross-correlated with the original input pulse to sample the phota at a particular time after a pre-determined number of round trip times. This value is directly detected with a cross-correlator and/or a 6-bit A/D converter. This process is repeated with the same input pulse until a high-resolution time sampling of the phota throughout a target duration is achieved. In a production system, only a single challenge and response is required as single-shot, high-resolution sampling will be used. A decaying exponential function is fit to the collected data and the inverse of the exponential function is applied to the samples to remove the decay. A probability distribution of the amplitude of the optical power is generated from the collected data. An interpolation method is applied to the PDF by inserting 0s into the original signal and then applying a low pass interpolating filter to the expanded sequence. This interpolated PDF is used to estimate values in between the $2^{6-1}$ levels from the initial A/D conversion. Non-uniform levels and bins are calculated based upon the interpolated PDF that have an equal probability of occurrence. The algorithm selects N points from the time-sampled phota sequence and maps them into the non-uniform levels. In practice, N is determined by the single-shot sampling rate and Signal to Noise Ration (SNR). This operation spreads out the selected points evenly in amplitude. Based upon their location in the non-uniform levels, new binary 6-bit sequences are assigned to each point. The algorithm selects k least significant bits from each sample and concatenates the bits into an overall bit sequence representative of the phota. These steps enhance its indistinguishability from a true random binary sequence. The system repeats this process for every CRP.

Figure 9A:
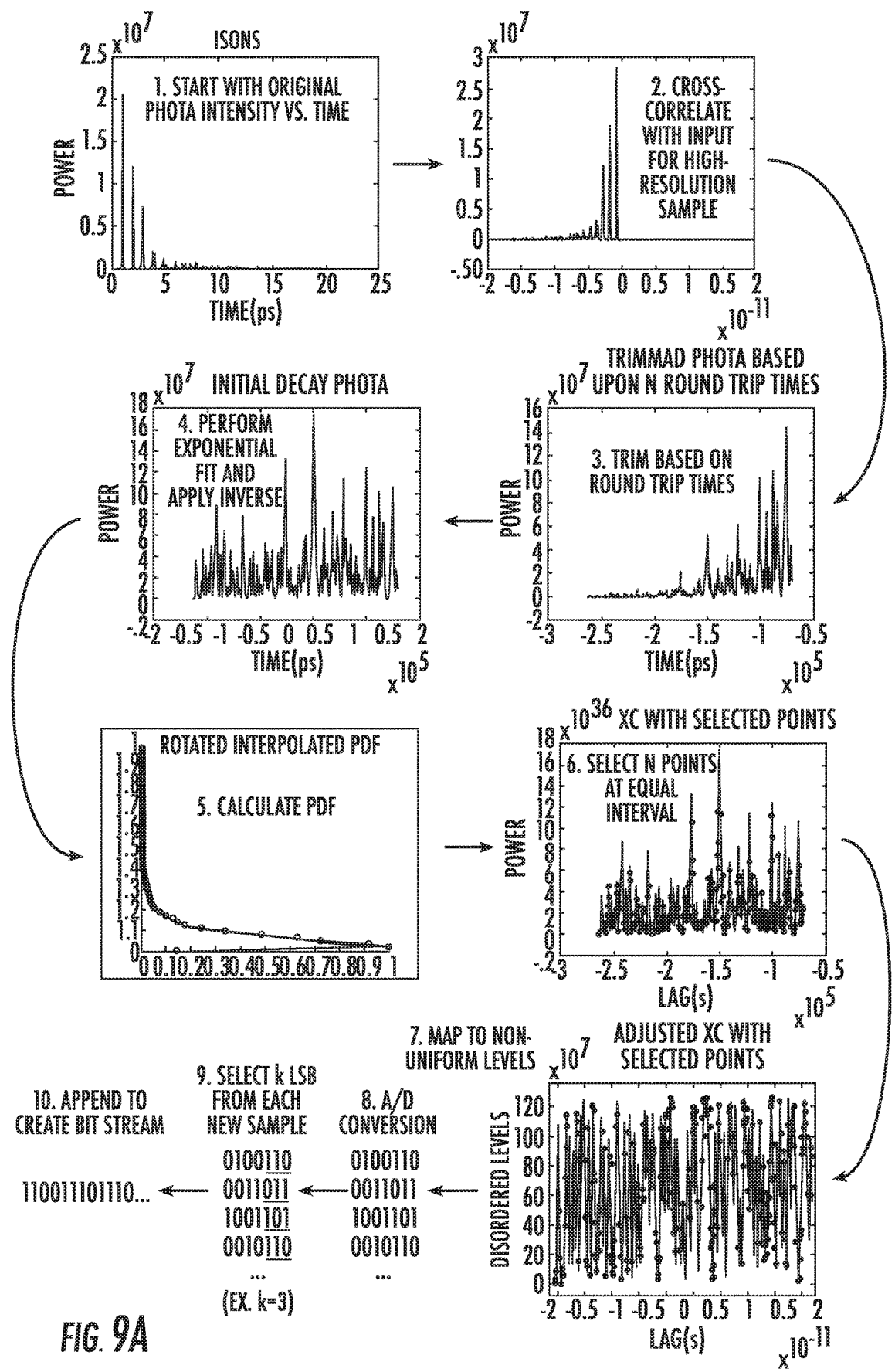
FIG. 9A and FIG. 9B illustrate embodiments of an analog-to-digital detection process.
Figure 9B:
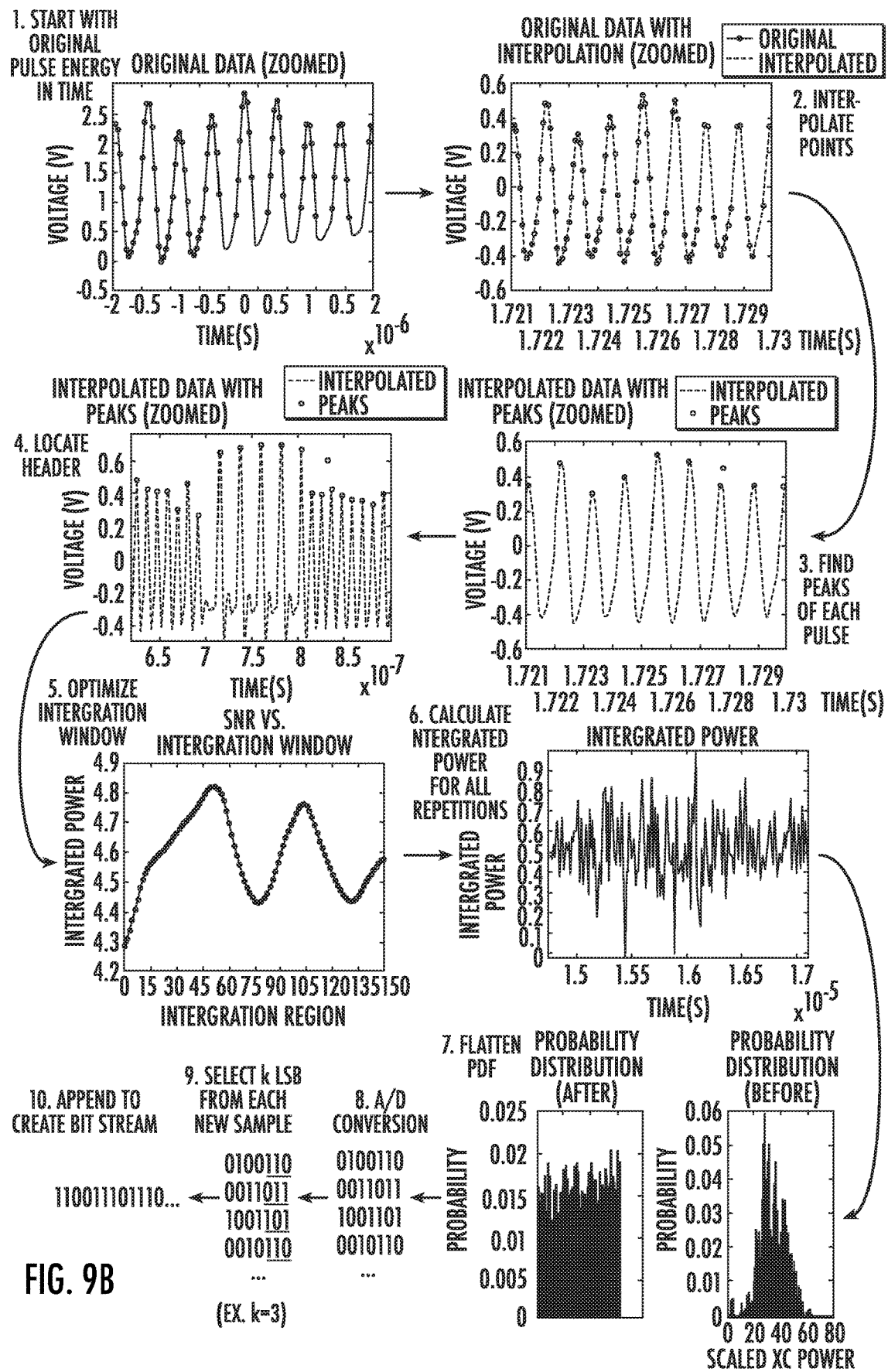
Figure 10:
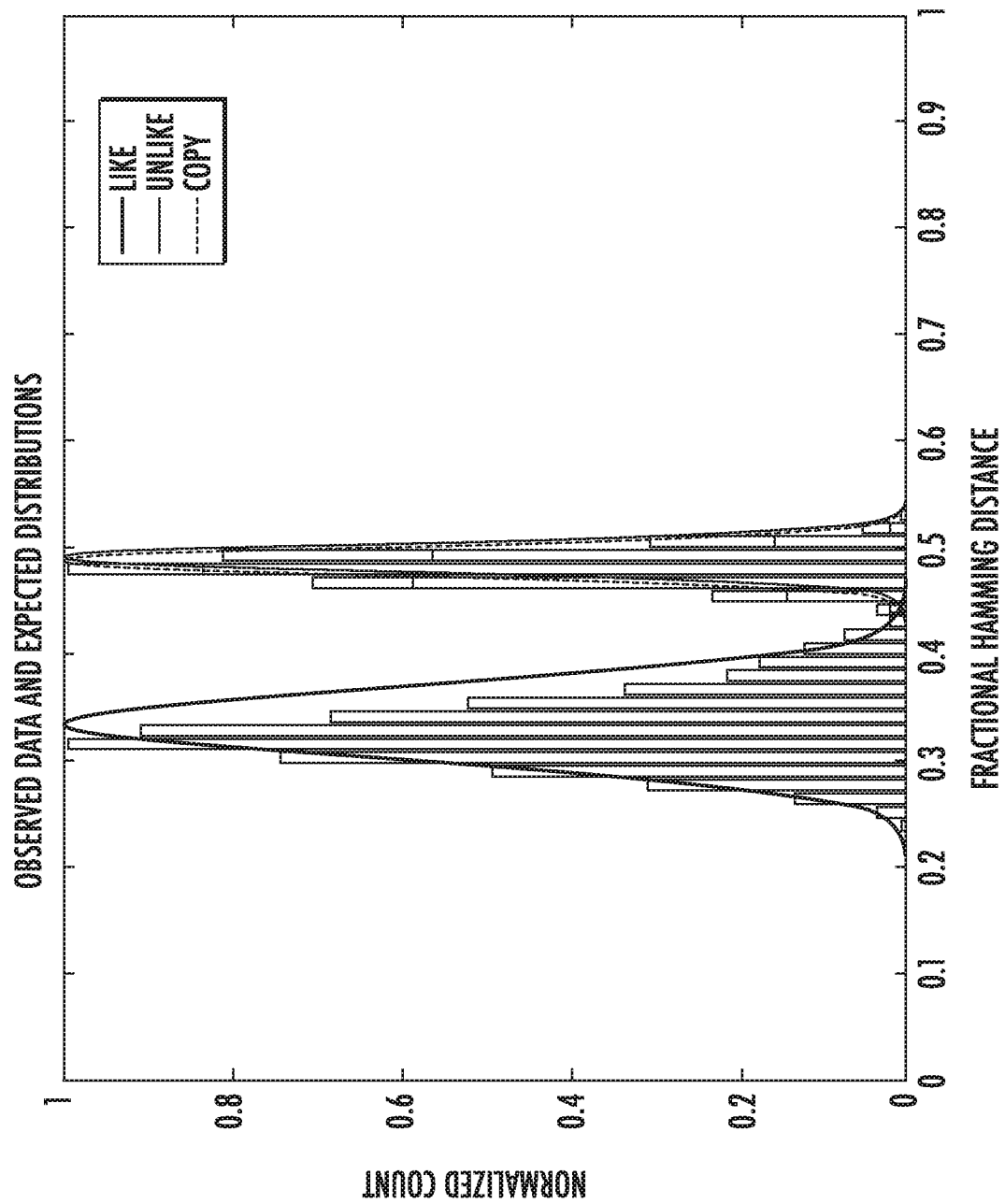
FIG. 10 illustrates like and unlike device fractional hamming distance distributions from observed data.
Figure 11:
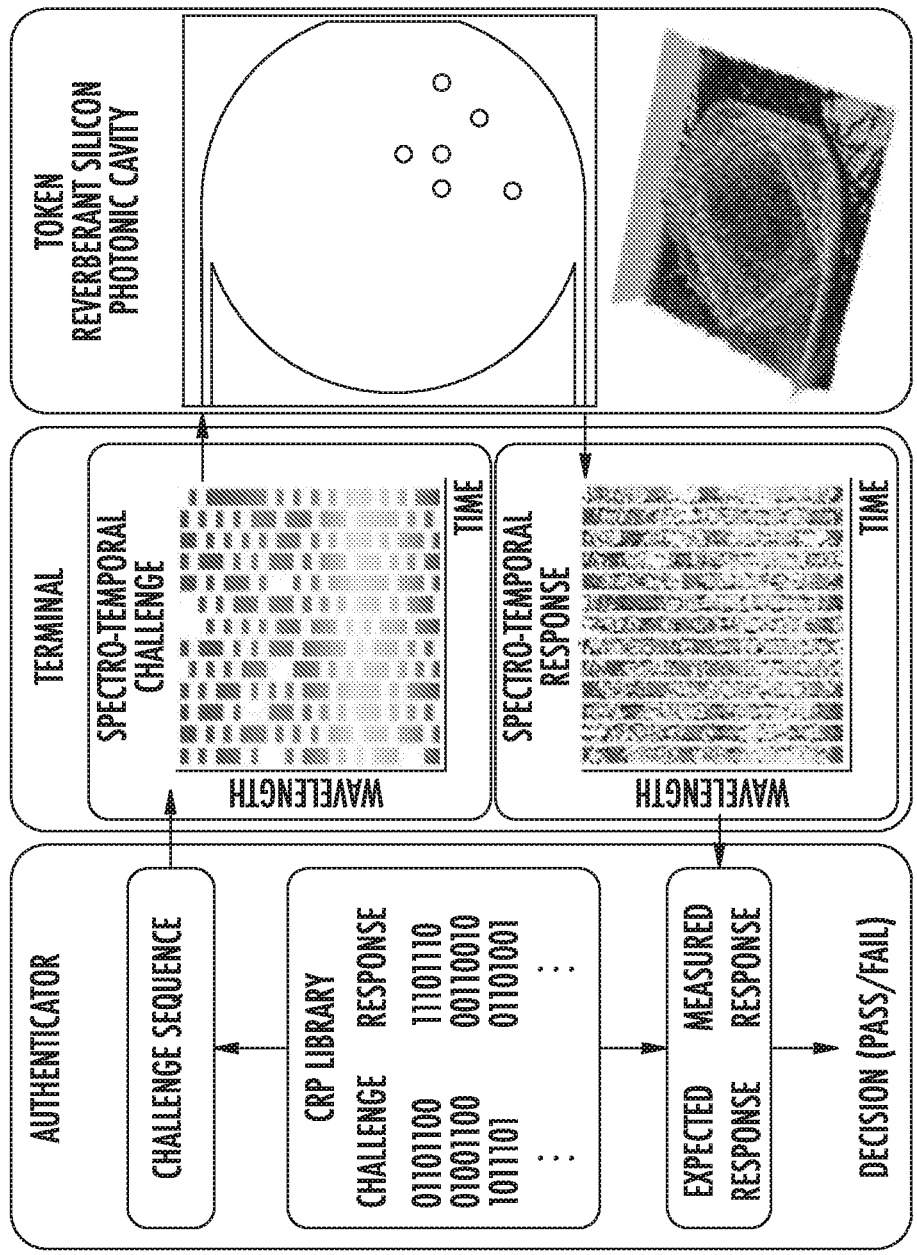
FIG. 11 illustrates a flow diagram according to a system and method of the present invention.

In another embodiment, as shown in FIGS. 9A and 9B, a pulse from a Mode Locked Laser (MLL) that was sent through anomalous dispersion fiber stretches the pulse in time. The monitor port from the MLL is detected on a photodiode and sent through a RF filter. A Pseudo-Randomly Binary Sequence (PRBS) is applied to a Pulse Pattern Generator (PPG) to encode the now electrical signal representation of the optical pulse from the monitor port. This signal is applied to a Mach Zehnder Modulator (MZM) to encode the PRBS onto the stretched pulse from the MLL. This encoded pulse is sent through a normal dispersion fiber to compress the pulse in time. Further, this pulse is amplified and sent into the cavity at high power to operate within the nonlinear regime of the cavity. In other embodiments, lower power operation is sufficient. The response from the cavity is filtered in polarization such that only a desired polarization state is selected for further processing. The output is amplified and sent through a spectral filter with a pseudo-randomly generated amplitude and phase response. In another embodiment, highly nonlinear fiber may be used before the spectral filter to further take advantage of optical nonlinear behavior. In this embodiment, the challenge set comprises the input pattern to the pulse pattern generator, the amplitude of the spectral filter, and the phase of the spectral filter. The response before digital processing is the resultant power level detected from the photo-diode. As shown in FIG. 11, one method of A/D conversion of the sampled power is shown. The original data is interpolated to enhance the available points in between samples. The algorithm then finds the peaks of the resultant power signals that correspond to individual challenge pulses. To enhance the SNR of the sampled signals, an optimization routine is run on the sampled data to determine an ideal integration window. Once determined, a window centered at the peak centroid for each response is integrated over to produce an integrated power measurement. A PDF is calculated for the challenge session and non-uniform levels are selected to make any subsequently collected responses equiprobable when converted to binary. The integrated powers are discretized and converted to binary against the non-uniform levels. Some number of LSBs are kept from each sample and appended together to create a single bit sequence representative of the challenge session.

Figure 12:
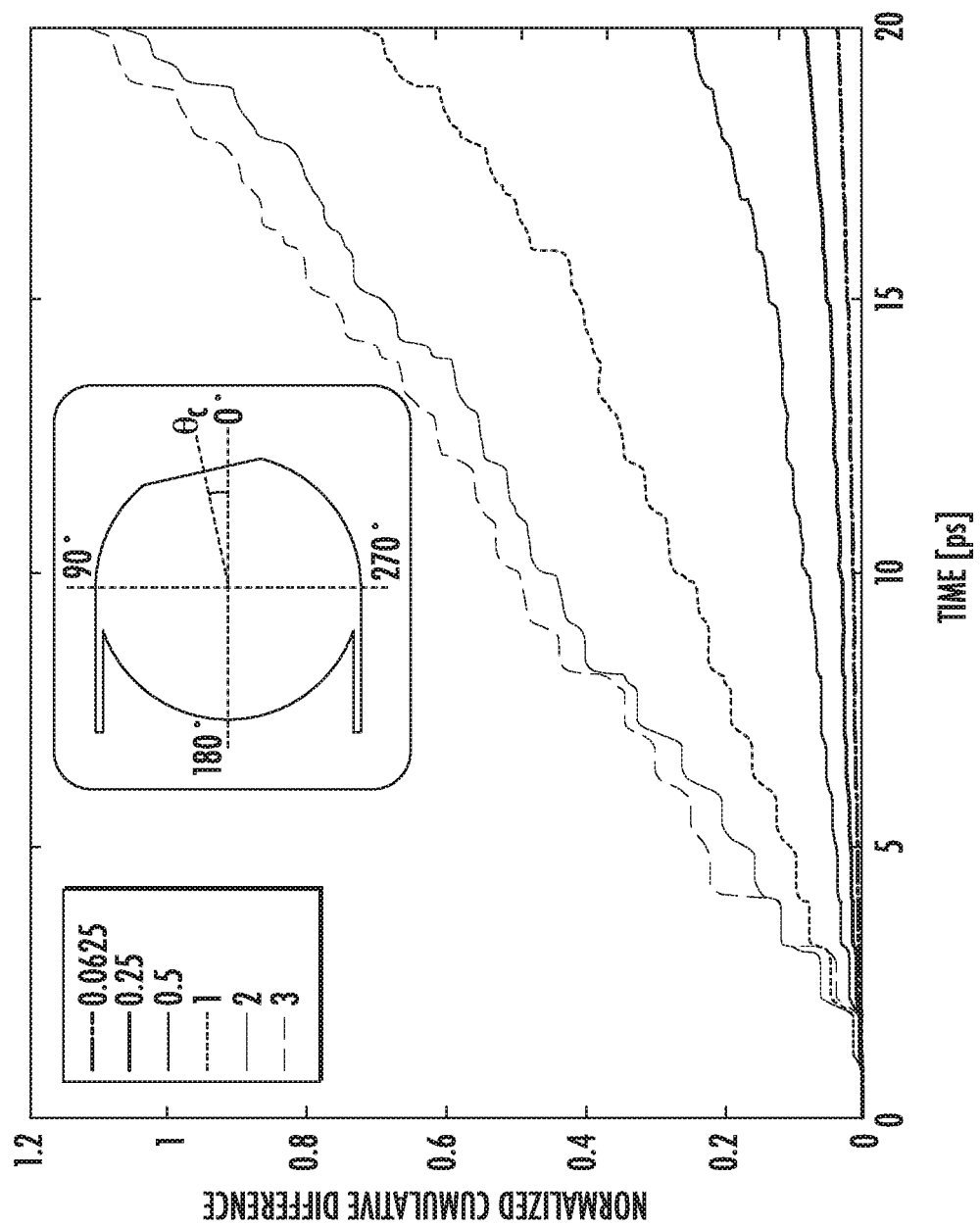
FIG. 12 illustrates a graphical view of a typical distribution of FHD metrics calculated from repeated measurements of the same responses from the same challenges to the same tokens compared to those from other tokens.

The authenticator stores individual challenges and their responses, not complete challenge sessions. In this manner, the authenticator can build a challenge session from the available individual challenges. The resultant binary sequence generated by the detection process is compared to the expected binary sequence calculated from a combination of the stored challenges that form the challenge session in question. The authenticator calculates the Fractional Hamming Distance (FHD) between these two sequences and compared this to the predefined threshold. If the FHD is lower than this threshold, the token is deemed to be authentic, otherwise the token is deemed to be unauthentic. FIG. 12 shows a typical distribution of FHD metrics calculated from repeated measurements of the same responses from the same challenges to the same tokens compared to those from other tokens. These metrics form the "Like" and "Unlike" distributions that should follow a binomial distribution. A detection threshold can be selected that optimizes total error rate, which is a combination of False Acceptance Rate (FAR), and False Rejection Rate (FRR). Further, such combinations of challenges in challenges sessions and the challenges themselves are only used once for a practical system.

Embodiments may include trusted and untrusted terminals. Trusted terminals are deemed secure in the sense that their physical hardware is unmodified. Thus, the system can perform all of the necessary detection and signal processing locally, then send a binary sequence response for the challenge session over standard telecommunications infrastructure. The trusted terminals still have latency constraints such that an adversarial attempt to create a representation of the cavity using active means will be unsuccessful. Untrusted terminals may be open to modification and are not necessarily trusted to verify latency and send a binary sequence over standard infrastructure. In this embodiment, the system could leverage the Global Positioning System (GPS) tags to geolocate the tokens as well as the trusted terminals to calculate latency between the terminal and the authenticator. Should the token respond more slowly than the calculated expected latency, the token fails the process.

In another embodiment, the response due a given challenge is amplified and fed back into the input of the micro-cavity one or more times. This allows for the design of secure operational protocols that leverage physical laws to understand latency and impose system limits. Should an adversary attempt to build an active system that attempts to reproduce the response of the cavity with optical and electronic systems, there will be added latency beyond the true response of the cavity. The increased latency induced from the process of looping the output signal back into the legitimate passive cavity is well understood. Should an adversary be able to construct a similar active system, and by choosing a variable number of loops, the difference in latency between a false device and the true device will exacerbated thus minimizing the likelihood of spoofing.

The system also keeps track of failed responses and stores them in a separate repository for analysis. Security administrators may perform data mining on the CRP repository to see if such failed challenges from one claimed token actually correspond to the responses from another token. This may indicate that another user's token has been compromised. Thus, prompting a process to remove the offending tokens from the CRP DB and perform an investigation.

In one embodiment, a new optical physically uncloneable function (PUF) and corresponding authentication system uses a reverberant integrated photonic micro-cavity, as illustrated in FIG. 11. FIG. 11 illustrates a flow diagram of a system according to an embodiment of the present invention. The response waveform, or phota," is generated by illuminating the cavity with a spectrally encoded ultrashort optical pulse called an authentication challenge. Due to the cavity design, the input pulse excites an extremely large number of spatial modes that interact with the structural randomness of the cavity to produce at the output port a rich spectro-temporal response the characteristics of which verify the authenticity of the cavity. Within the reverberant cavity, the Fresnel equations govern the propagation of photons as they transmit energy at the resonator boundary in a manner analogous to the chaotic paths taken by a massless ball reflecting from the lossy walls of a leaky billiards table. The micro-cavity preferably takes the form of a disk with a chamfer, which, in dynamic billiards, exhibits chaotic behavior. Using co-integrated single-mode silicon waveguides to couple to and from the cavity, provides a substantially more robust approach than other approaches. Ultrafast temporal and spectral characterization shows that the photas are highly sensitive to details of the cavity design yet are consistent over time. The nonlinearity of the cavity increases the challenge-response space and thus the security of the device. Finally, a robust authentication system is shown by the real-time measurement of a sequence of challenge-response pairs (CRPs) to verify the authenticity of the cavity. The ability to clearly distinguish different cavities demonstrate that even attempts to directly copy the cavity by nanofabricating an identical device ultimately fail due to unavoidable variations in sidewall roughness, precise film thickness, resist granularity, and the like.

Finite element time domain (FETD) simulations portray divergence over time of the responses to a 100 fs input pulse for each of six chamfer positions, nicely demonstrating the sensitivity of the phota shape to even small changes in cavity design (FIG. 12), as expected for a chaotic system. While these simulations provide insight into the general behavior of the cavity, they cannot predict the response of a fabricated PUF because detailed random properties of the device are not known.

FIG. 12 illustrates a graphical view of normalized separation distance between simulated photas. A baseline geometry was simulated with an input Gaussian envelope pulse of 100 fs FWHM at a center wavelength of 1550 nm. Additional simulations of designs varying only by chamfer angle were performed and each output intensity envelope was compared to the baseline geometry via a cumulative difference and first normalized to the total summation of the baseline power samples after removal of exponential decay. The increased slope of each curve shows consistent separation as a function of geometrical deviation, which suggests chaotic behavior.

To experimentally investigate this novel optical PUF, the present invention is tested by fabricating a set of approximately 30-μm diameter integrated photonic cavities using standard CMOS-compatible fabrication techniques from single-crystal silicon semiconductor material (~250 nm thick) clad with 1 μm of silicon dioxide. This compatibility provides straightforward integration with semiconductor electronics. Additionally, the optical PUF device is extremely small (<160 μm$^3$), passive, power-efficient, inexpensive to produce, and operates at telecommunication wavelengths allowing for direct interfacing with telecommunications systems. Seven unique designs were tested, each differing in a single design parameter including existence, size, and position of the chamfer as well as the presence of randomly positioned holes within the cavity (see the example SEM images in FIG. 13). Additionally, two copies of each cavity were fabricated on the same silicon die to analyze the ability to directly copy such a PUF if the design is known by an adversary.

Figure 13:
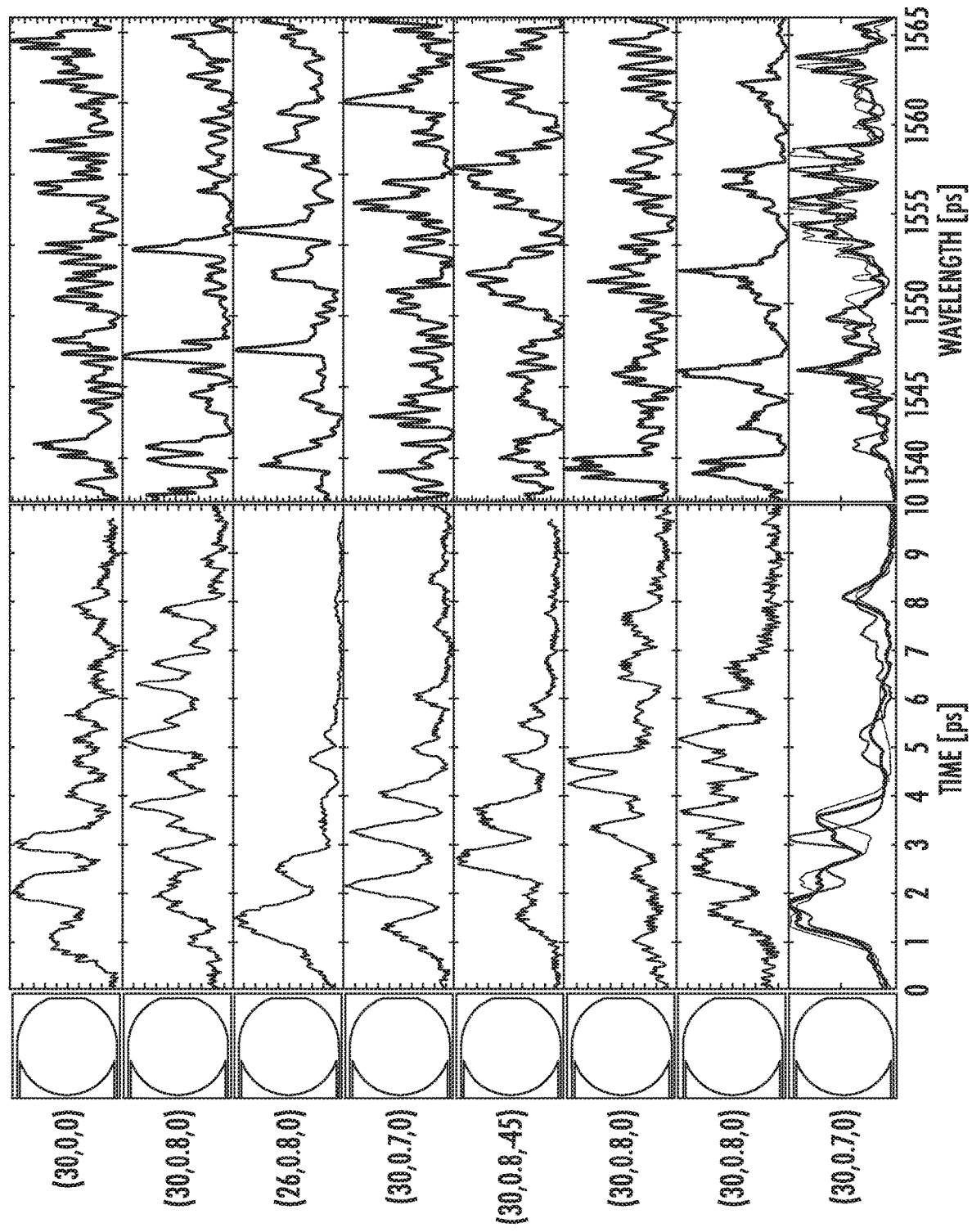
FIG. 13 illustrates graphical views of experimental time domain and frequency domain results at the Transverse-Electric polarization state.

To investigate experimentally the sensitivity of responses to distinct cavity designs, the photas were captured as the scanned cross-correlation of narrow (175 fs), 1556 nm, TE mode-locked laser input pulses with their respective output photas. The output spectrum is captured using an optical spectrum analyzer, as illustrated in FIG. 13). Both representations are unique to the cavity and exhibit distinct behavior with the small changes in cavity geometry (FIG. 13). The decaying resonant peaks can be attributed to initial forming and subsequent disruption of whispering gallery modes (WGMs) due to the cavity geometry. In addition, nonlinearity due to the Kerr effect and two photon absorption and free-carrier absorption and dispersion significantly modify the response (FIG. 13), making nonlinearity cloning even more difficult.

FIG. 13 illustrates graphical views of experimental time domain and frequency domain results at the Transverse-Electric polarization state. Left. Cavity SEM images with inset of design parameters (diameter in microns, chamfer size in terms of radius, and chamfer angle with respect to the unit circle). Middle. Normalized time domain response from cross-correlation with a sinc pulse (175 fs FWHM). Right. Normalized transfer-function magnitude for the same experiment. These results show unique responses from different cavities. The bottom row shows the nonlinear power dependence of a cavity in response to different excitation pulse energies (24.7 pJ, 66.8 pJ, and 113.8 pJ).

To use the PUF in an authentication application, each of a sequence of challenge pulses were spectrally amplitude encoded with a unique binary codeword. Real time measurement of such a pulse stream is nearly impossible. To complete the challenge the cavity responses were to amplify and nonlinearly filter using a static pseudorandom spectral transmission pattern. In addition, at high pulse energies, cavity nonlinearity allows for self-mixing to generate additional spectral components. A photodiode detects the total pulsed energy from the programmable filter and an analog-to-digital converter (ADC) produces a binary representation of each response that can be used as an encryption key.

Due to the complexity of the highly multi-mode and nonlinear reverberance in the cavity, the response carries a large amount of information that serves as a "fingerprint" of the micro-cavity. The authenticator selects a challenge-response set from a previously populated Challenge-Response Library (CRL). The Fractional Hamming Distance (FHD) between the measured response and the expected response is calculated and compared to a detection threshold. If the FHD is less than the threshold the cavity is determined to be authentic, if the FHD is greater than the threshold, the cavity is determined to be illegitimate. The Token panel shows an example Scanning Electron Microscope (SEM) image of a typical micro-cavity design. Below the SEM is a Finite Difference Time Domain (FDTD) simulation of the integrated spatial intensity within the cavity for excitation by an ultrafast pulse.

Repeating the foregoing process, a library of CRPs is generated. In application, the authenticator selects a set of randomly selected CRPs and sends the challenge sequence to the token, recording its response, and extracting a sequence which is compared with the expected sequence. The authenticator then calculates the fractional Hamming distance (FHD) as the fraction of bit positions in which the resulting and expected sequences differ. Comparing the FHD to predetermined thresholds permits computation of the false rejection rate (FRR) of the legitimate cavity and the false acceptance rate (FAR) of a non-authentic cavity. The CRPs are measured in real-time using a single pulse sequence without any averaging and a challenge-response set for 2048 bits is executed in only 3.8 μs.

Figure 14A:
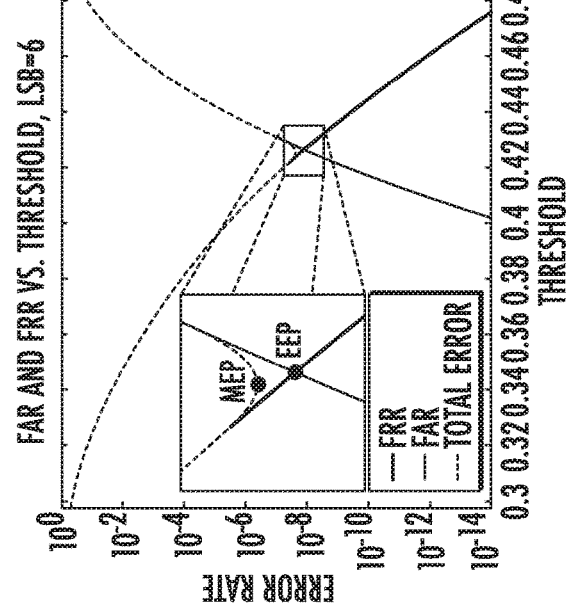
FIGS. 14A-14D illustrate graphical views of experimental results for repeatability.

FIG. 14A shows a typical distribution of FHD results from repeated challenges and the corresponding responses. The binary sequences generated from a single cavity upon repeated challenges are compared to each other forming the "like" distribution. Likewise, for a given challenge the sequences generated from one cavity design are compared to those from the other cavity designs for all combinations forming the "unlike" distribution. Binomial probability mass functions are fit to the distributions and the separation of these distributions represents the robustness of the system. Essentially, these two distributions represent attempts at authenticating with a legitimate and illegitimate device respectively. The FRR, FAR, and subsequent total error generally increase with a decreasing number of LSB kept in the fuzzy extraction algorithm as shown in FIGS. 14C and 14D These values were used to determine detection threshold which minimizes total error (FIG. 14B) as there is tradeoff between FAR and FRR (FIG. 14C). At the six LSB operating condition, the total authentication error is approximately $10^{-8}$.

To investigate the ability to directly fabricate a second, identical micro-cavity, a cloning attack was performed against the device by fabricating copies of each design. To minimize possible variations in the nanofabrication process all of the copies are simultaneously fabricated in close proximity to the originals on the same silicon die. A comparison of the binary sequences produced by these attempted duplicates shows that they are completely uncorrelated and that their distributions align closely with those of the unlike cavities as shown in FIG. 14a. Furthermore, the FAR for the cloned cavity is $\sim 10^{-8}$, indicating a 1 in 100,000,000 chance of mistaking the cloned cavity for the legitimate cavity. Thus, the chaotic nature of the cavity response and the unavoidable nanoscale variations in its structure are sufficient to produce completely distinguishable CRPs, indicating that this system is highly resilient to such cloning attacks.

Figure 14B:
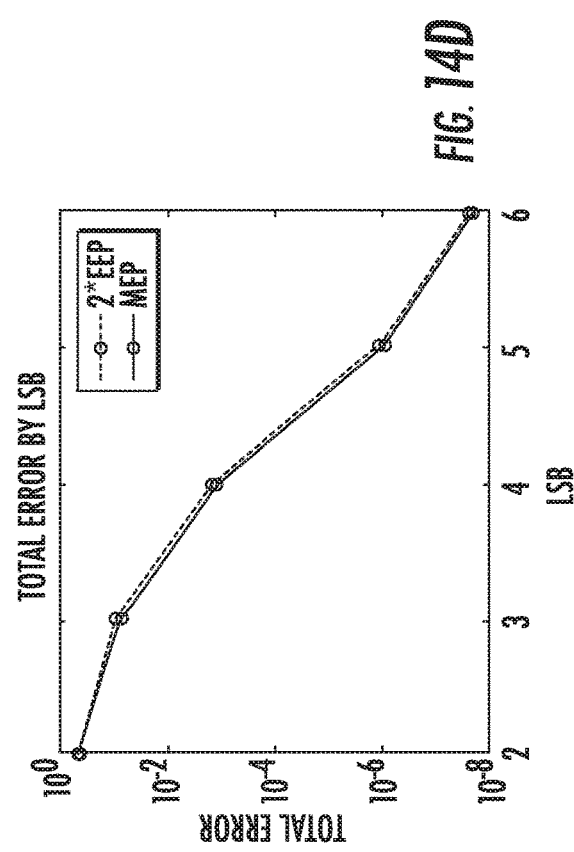
Figure 14C:
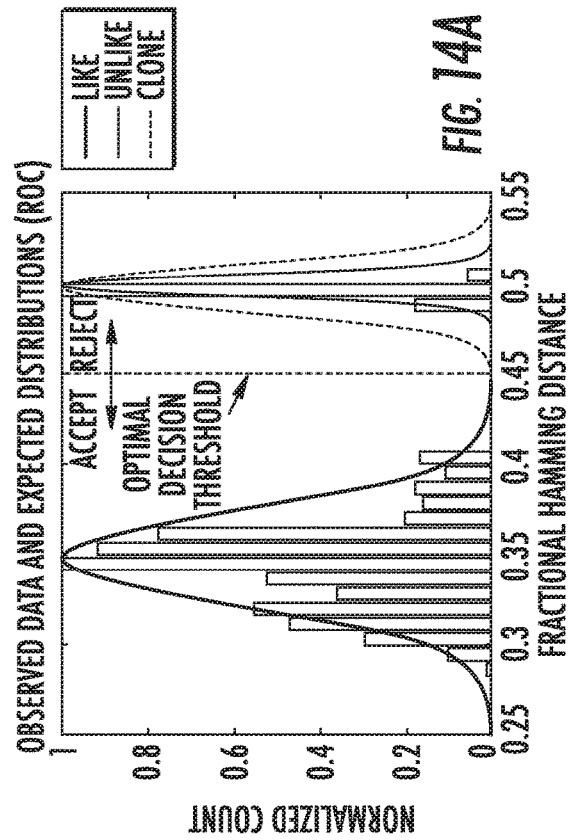
Figure 14D:
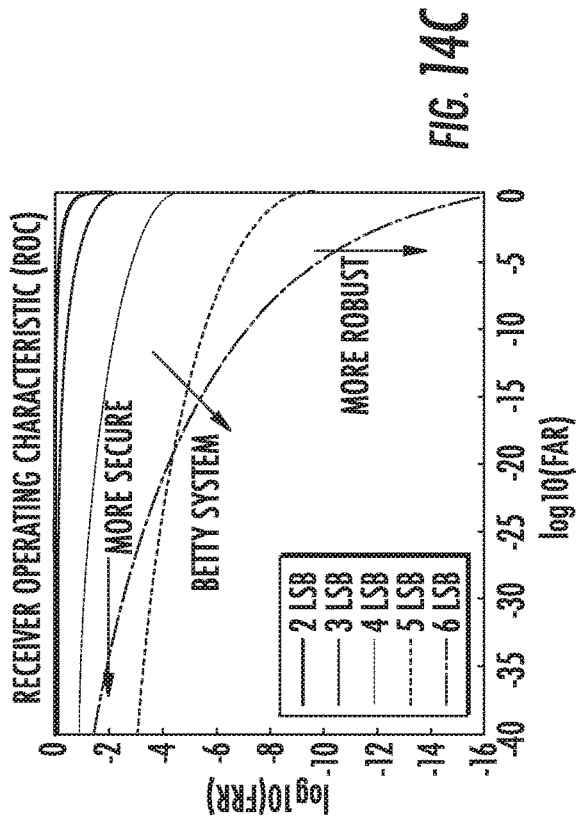

FIGS. 14A-14D illustrate graphical views of experimental results for repeatability. FIG. 14A illustrates a normalized FHD binomial distributions and histograms for binary responses from like designs, unlike designs, and clones of the same device with corresponding binomial distributions and histograms (clone histogram omitted for clarity). 8550 unique challenge patterns were used to form a single challenge set. The FHDs were measured for the output bit sequences where five LSBs are kept from each successive XOR operation for 468 repetitions of the same challenge and response set yielding 42,750 bits per response set. The unlike distribution shows the variation of FHD between unlike designs. The like distribution shows the variation of distances between 468 challenge-response cycles of the same design. The copy distribution shows variation of FHD due to fabrication variance as the FHD of the binary responses from two separate copies of the same device design were measured. The unlike binomial fit and the clone binomial fit showing decorrelation between attempted copies. FIG. 14B illustrates the FAR and FRR shown versus decision threshold. The Minimum Error Point (MEP) and Equal Error Point (EEP) are shown for a six LSB algorithm setting (51,300 bits per response). FIG. 14C illustrates the Receiver Operating Characteristic (ROC) curves for two to six LSB operating conditions. Traversal along the curves show tradeoff between error types and detection thresholds. FIG. 14D illustrates the total error rates shown by LSB selection for the MEP and twice the EEP.

The security of this authentication system results from a combination of the complexity of the chaotic response of the cavity and the speed with which the cavity responds. An adversary wishing to emulate the device would have three primary approaches available: cloning through direct cavity replication, optoelectronic cloning, and computational cloning. As shown here, the precision of nanofabrication technology prevents direct cavity replication. Furthermore, given the sub-50-ps response time and nonlinear properties of the device, optoelectronic cloning using, for example, a programmable spectral filter (e.g. 4-f pulse shaper) is impossible due to the intrinsic linearity and significantly larger size and thus the increased latency of such a filter (roughly 3 ns or two orders of magnitude increased latency). Further, within the system's operation, it cannot be probed correctly to be reverse engineered. Finally, even if an adversary had complete knowledge of the CRP space, to successfully emulate the device the adversary would need to detect an incident challenge, perform the necessary computations (e.g. lookup table or transform), and generate the appropriate response in a time interval faster than 50 ps. This is significantly shorter than a modern computer clock cycle, thus preventing such an approach with current or any foreseeable computational resources. Therefore, in the worst-case limit, the adversary is limited to attempting random responses.

Secure authentication is of paramount importance to the information-centric society. Due to their simplicity, compactness, silicon compatibility, and resulting cost effectiveness, these unclonable optical micro-cavity authentication devices can find wide-spread application in a range of technologies including mobile devices, computers, smart authentication tokens, credit cards, and secure data storage devices. Furthermore, simple micro-cavity devices are investigated, but it is envisioned that numerous other interferometric multi-mode integrated photonic devices (e.g. multi-mode interferometers) can be similarly leveraged as PUFs. Furthermore, the scalability of silicon photonic integration indicates that a large number of these devices can be integrated in parallel and an interconnected system of such devices can be leveraged to further increase the security. Finally, due to the intrinsic bandwidth of this approach and compatibility with single-mode optical fibers and telecommunications wavelengths, it is anticipated that the security afforded by these devices can be extended to secure ultra-high-speed communications systems.

In the following, exemplary implementations, the present invention is tested. The tests are first composed of modeling and simulating various designs using full Maxwell's equations solutions to characterize light transport through the cavities. Once optimized, the most promising devices were fabricated. Time-domain and frequency-domain experiments were performed accordingly. These experiments include repeatability over time and also power-dependence of the cavity response. Once the devices were adequately understood, an authentication system was designed and constructed around the devices. As is common for the evaluation of physically unclonable functions (PUFs), a robustness and unpredictability analysis was performed on the system. The robustness analysis considered the variance in the responses in terms of the Fractional Hamming Distances (FHD) between binary sequences. A sensitivity analysis on the input PRBS and the spectral filter features was also performed to investigate how the output response to varying input. Lastly, an initial security analysis was performed to evaluate the confidentiality of the complete system.

Photon Design's OmniSim Finite Element Time Domain (FETD) solver was used to model the operation of the integrated photonic cavity. FETD is a finite difference time domain (FDTD) algorithm variant that leverages irregular non-orthogonal structured grids in order to simulate more accurately fine details that significantly affect electromagnetic performance. OmniSim supports higher order elements, which can improve accuracy for high resolution simulations. A convergence study concluded that third-order elements with a nominal resolution of 300 nm were sufficient. This 2D simulation of triangular elements was only one finite element thick in the device y-direction the plane of calculation. A nominal element size of 150 nm was the input to the meshing algorithm that resulted in a mean physical element size of 34 nm and a minimum physical element size of 13 nm for a total of ~163,000 elements. A single, multi-edged polygon was used to create the geometry, allowing for smooth meshing across cavity features. The bus waveguides intersect with the circular disk at a single point, causing challenges for the meshing algorithm as it creates very small elements to resolve this geometry, in turn requiring a significantly reduced minimum time step for the simulation. To reduce this effect, a small chamfer of 60 nm was added to this intersection. On the input bus waveguide, a mode excitor calculated supported modes using the effective index solver for both the TE and TM modes. Gaussian pulse shapes with 100-fs and 200-fs full-width half maximum were used with a time delay of four times the respective standard deviations in time. The add and drop bus waveguide dimensions were designed for supporting the fundamental mode using MATLAB. Sensors were placed after the mode excitor on the add waveguide and on the drop waveguide. Careful design of the field sensors takes into account the evanescent tails of the fundamental mode of the bus waveguides. Drude material models for silicon and silicon dioxide were used to generate the material properties. A perfectly matched layer (PML) was used to impose a first-order absorbing Silver-Mueller boundary condition on all faces of the device.

Seven different primary designs were simulated, each with a variant along one of the three parameters of the design: the disk diameter, the chamfer size as a fraction of the radius, and the angular location of the chamfer with respect to the horizontal axis. These parameters form the coordinates of the design space. The "control" design is a 30-μm diameter disk with no chamfer. The "baseline" design is a 30-μm diameter disk with a 12-μm (80% of the radius) chamfer located at the 0° position. The "diameter" design is a 26-μm diameter disk with a 10.4-μm (80% of the radius) chamfer located at the 0° position. The "chamfer" design is a 30-μm diameter disk with a 10.5-μm (70% of the radius) chamfer located at the 0° position. The "angle" design is a 30-μm diameter disk with a 12-μm (80% of the radius) chamfer located at the −45° position. The "hole #1" design is a 30-μm diameter disk with a 12-μm (80% of the radius) chamfer located at the 0° position with a unique hole pattern. The "hole #2" design is a 30-μm diameter disk with a 12-μm (80% of the radius) chamfer located at the 0° position with a unique hole pattern.

The devices were designed in the Tanner L-Edit integrated circuit tool. The devices were fabricated at the NIST Center for Nanoscale Science and Technology (CNST). A Joel Electron Beam Lithography (EBL) tool, part number JBX-6300FS, was used to manufacture the integrated photonic device. The EBL tool writes patterns of 8 nm or less, leveraging a 2.1-nm beam at a 100-kV accelerating voltage. The EBL tool has a high-precision stage that employs beam positioning DAC of 19 bits with 0.125-nm resolution and laser interferometer with 0.6-nm resolution, which achieves a writing positional accuracy of 9-nm or less for small fields to large-area fields.

The devices were fabricated on Soitec silicon-on-insulator wafers with a 500-nm thick top silicon layer and a 3-μm buried oxide layer, on top of a 500-μm silicon substrate. The top silicon layer was thinned down to a thickness of 220-nm in two steps of wet thermal oxidation followed by oxide removal via HF etch. A 100 nm thick layer of silicon dioxide was intentionally left over in order to serve as a hard mask in a subsequent etching process.

The wafers were spin-coated in MaN-2405 negative tone photoresist. Device patterns were then written to the resist by electron beam lithography. After development in MF-319 developer, the device patterns were transferred to the silicon dioxide layer via reactive ion etching to form a hard mask. This hard mask was then used to pattern the devices in the silicon layer with inductively coupled plasma etching. Finally, the devices were clad with a 1-μm layer of silicon dioxide. The wafers were then diced to separate individual devices, and the edge facets were polished using fine grit diamond film in preparation for edge coupling.

There are several sources of variance in the integrated photonic manufacturing process. The standard beam size is 20 nm and the shapes are defined to the pixel or nm level. When the electron beam is applied to the resist, the resultant polymer chains are greater than 1-5 nm in size. The minimum feature size is 20-50 nm. If the two cavities are drawn close enough together, the surface roughness will be very similar since the beam current remains relatively constant over that small of a spatial distance and time. While the Joel JBX6300-FS, can be significantly reworked to generate a 2-nm spot size specification, the standard operation settings yield a 20-nm spot size thus providing increased variance. Stitching field resolution does not impact the operational parameters of this device as it is ensured that the component is built within a single field. The resist specifications also affect the resolution of the features since the material is discrete and quantized. In this application, it is undesirable to reflow the resist. While it typically decreases losses, it will also remove key features when patterning an intricate shape.

In order to observe the time-domain output phota, several cross-correlation experiments were performed. An MLL (PolarOnyx Mercury Series) with a 90-MHz pulse repetition rate was spectrally broadened in nonlinear normal dispersion fiber (Corning Vascade LS+) and filtered and temporally compressed by a programmable spectral filter (Finisar WaveShaper 1000s, C-Band) to create nearly transform-limited sinc-shaped pulses with 5-THz of bandwidth traveling into the cavity. A fiber splitter diverts 80% of the optical power to the cavity and 20% to the reference arm. A polarization controller and tapered fiber is used to couple into the cavity; the cavity output is collimated with a high-NA aspheric singlet and passed through a linear film polarizer to select the desired polarization state. This is then coupled into an erbium-doped fiber amplifier (EDFA) (Amonics C-band Preamplifier) before reaching the cross-correlator (XC) (Femtochrome Research FR103XL). Chromatic dispersion due to the single-mode fiber (SMF) in the two arms from the MLL illuminating the cavity and acting as a reference pulse, respectively, is compensated up to the free-space inputs to the XC for optimal temporal resolution.

The primary experiment for the authentication system leveraged the aforementioned PolarOnyx MLL. A novel ultrafast pulse shaper spectrally encodes the amplitude of each pulse[12]. DCF stretches the 300-fs MLL pulse to greater than 11 ns. The temporally dispersed spectrum is amplitude encoded by a length 128 PRBS at 11.52 Gbit/s that is synchronized to the MLL. There is some overlap between time stretched pulses at this stage and thus neighboring pulses share some temporal features. However, they are mapped to different wavelengths and thus involve different parts of the pattern. This allows the pulses to remain incoherent while providing more features on each pulse. The number of features per pulse is, $N=|D_1|\Delta\lambda R_{PRBS}$, where $D_1$ is the total dispersion, $\Delta\mu$ is the spectral width, and $R_{PRBS}$ is the pattern modulation rate. For this experiment, ($D_1=-247$ ps/nm, 11.52 Gbit/s modulation rate, and $\Delta\lambda=33$ nm), 94 features per pulse are achieved. After spectral patterning, the pulses are compressed using $D_2=+247$ ps/nm fiber to 6 ps. These pulses are amplified with an EDFA (Amonics C-band Erbium Doped Fiber Amplifier AEDFA-PA-35, 150 mW) to an average power of 64 mW. The pulses are passed through a PC in order to control the input polarization to the cavity. A tapered fiber-to-waveguide coupler is used at the chip edge in order to couple into a tapered waveguide for mode field diameter matching. A free-space lens is used on the output to focus the light through a tunable polarizer, into a collimator, and then into single-mode fiber. For different polarization states, the polarizer is set to the TE, XP, or TM setting and then the total power is maximized using the PC. While this maximizes the power associated with the output polarization state, it is possible that the input polarization state is slightly cross-polarized as birefringence within the waveguides and cavity itself may contribute to changes in polarization. The output pulses are then sent to another EDFA (Amonics C-band Erbium Doped Fiber Amplifier AEDFA-PA-30, 20 mW) to pre-amplify for detection. The amplified pulse is send through a spectral filter (WaveShaper 1000s, C-Band), which applies 296 continuous amplitude and phase features to the pulse. The input pulse bandwidth (1535-1575 nm) was not aligned with the spectral filter used in the experiment (1527.4-1567.5 nm), thus some of the spectrally-encoded information was lost. The filtered pulse was sent to a photo-diode and detected with an analog-to-digital (ADC) convertor (Prologic Designs ADC16100LAN, Analog-Digital Converter) which could store over four million samples and was synchronized to the MLL. In some configurations, a standard oscilloscope was used with a 120,000 sample limit.

The measured power level from the system is then transformed into a binary sequence though an analog to digital fuzzy extraction algorithm which enhances its indistinguishability from a true random binary sequence. In the oscilloscope detection configuration, the original measurements are interpolated to enhance the available points in between peak power samples. The algorithm then finds the peaks of the resultant power signals that correspond to individual challenge pulses. To enhance the SNR of the sampled signals, an optimization routine is run on the sampled data to determine an ideal integration window. Once determined, a window centered at the peak centroid for each response is integrated over to produce an integrated power measurement. In the Prologic ADC configuration, this step is not required as there is only a single point per detected pulse. A Probability Density Function (PDF) is calculated for the challenge set. A histogram equalization algorithm is used to calculate non-uniform levels that will make any subsequently collected responses equi-probable when converted to binary. In a practical system, the equalized levels are required to be stored in the CRP DB. The power samples are discretized and converted to binary against the non-uniform levels. An XOR operation is performed on adjacent sequences. Some number of LSBs are kept from each sample and appended together to create a single bit sequence representative of the challenge set.

During the key enrollment phase, a device is selected for evaluation. The terminal selects a challenge at random and sends that challenge pulse to the device. The device returns a phota in response to the challenge and is repeated 468 times to form an average power response before it is digitized per the aforementioned process. The binary representation of the response is stored with the challenge information as a CRP. This process is repeated to create a library of CRPs.

A nonlinear power experiment was performed to assess the impact of high peak power on a single cavity response. A 150-mW Amonics C-band Erbium Doped Fiber Amplifier AEDFA-PA-35 was used to amplify a ~175-fs FWHM input pulse from a 90-MHz MLL. A variable attenuator (WaveShaper 1000s) was used to evaluate different power levels. The time-domain (XC) and frequency-domain (OSA) responses to the cavity were measured.

A robustness and repeatability analysis was performed on the experimental designs. A common set of 8550 psuedo-randomly generated patterns of 128 bits were used for the challenge set. The Prologic Designs ADC16100LAN, Analog-Digital Converter could collect over 4 million samples with one sample for each input pattern yielding enough memory for 468 repetitions. Therefore, each configuration parameter set, e.g. chip, polarization state, copy number, and design, had 468 repetitions of the 8550 challenge set. All of the experimental data went through the fuzzy extraction algorithm to represent the 8550 patterns as a single bit sequence. Inter and intra-parameter Fractional Hamming Distances (FHD) were calculated for every possible combination of bit sequences. For each distribution, the mean and standard deviation was calculated. These values were used to calculate the effective number of independent bits via $N=p(1-p)/\sigma$, where p is the experimental mean and a is the experimental standard deviation[2]. These results were used to fit a binomial distribution to the different configuration parameter sets and consequently calculate the False Acceptance Rate (FAR) and False Rejection Rate (FRR) from the cumulative binomial distributions. The equal error lines for each LSB case are not aligned due to the variance from the fuzzy extraction algorithm.

The early stair-stepping behavior is due to the nature of the photon round-trip time of the cavity and the dissipation of Whispering Gallery Modes (WGMs) with each round trip as it transitions into chaos. Due to the complexity of the highly multi-mode and nonlinear reverberance in the cavity, the response carries a large amount of information that serves as a "fingerprint" of the micro-cavity. The authenticator selects a challenge-response set from a previously populated Challenge-Response Library (CRL). The Fractional Hamming Distance (FHD) between the measured response and the expected response is calculated and compared to a detection threshold. If the FHD is less than the threshold the cavity is determined to be authentic, if the FHD is greater than the threshold, the cavity is determined to be illegitimate. The Token panel shows an example Scanning Electron Microscope (SEM) image of a typical micro-cavity design. Below the SEM is a Finite Difference Time Domain (FDTD) simulation of the integrated spatial intensity within the cavity for excitation by an ultrafast pulse.

Figure 15A:
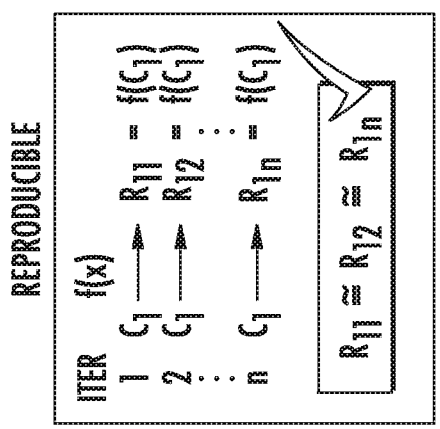
FIGS. 15A-15F illustrate diagrams of desired properties for the performance of an ideal PUF.
Figure 15B:
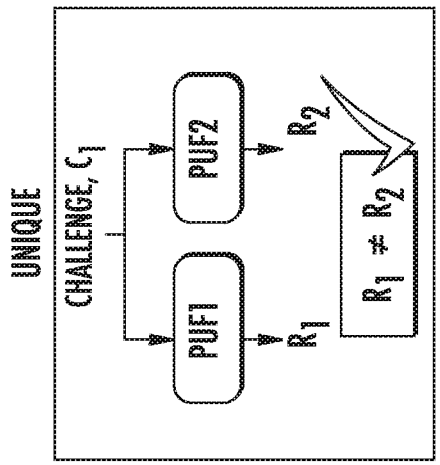
Figure 15C:
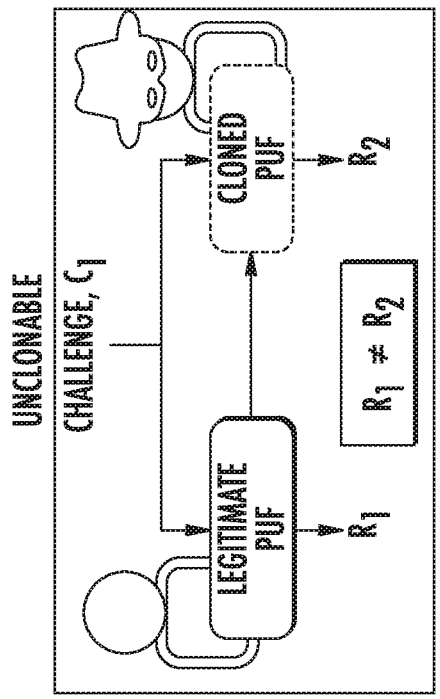
Figure 15D:
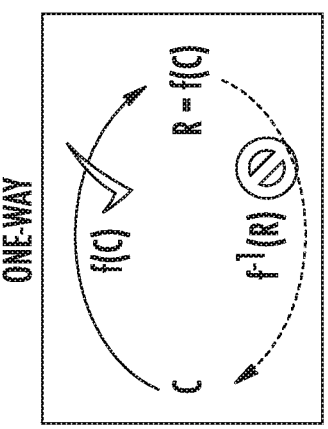
Figure 15E:
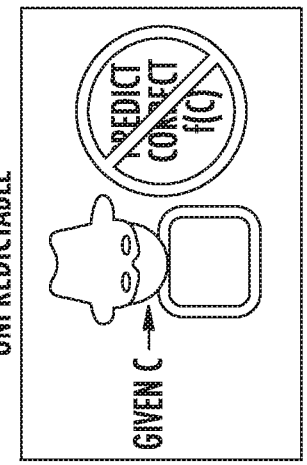
Figure 15F:
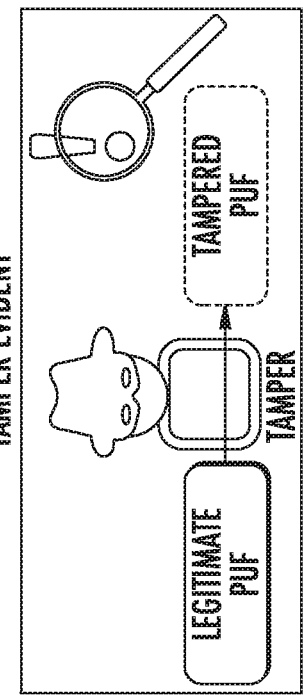

In an exemplary embodiment of the present invention, PUFs are interrogated using a challenge-response authentication protocol and an ideal PUF should exhibit behavior that is reproducible (only by itself), unique, unclonable, one-way, unpredictable, and tamper evident (FIGS. 15A-15F). FIGS. 15A-15F illustrate diagrams of desired properties for the performance of an ideal PUF. Specifically, PUFs should have a highly reproducible response to the same input challenge indicating determinism and low system noise, as illustrated in FIG. 15A. Different PUF designs should be unique, such that the same challenge given to two different devices produces vastly different responses, as illustrated in FIG. 15B. The PUF should be unclonable such that it is infeasible for an adversary with complete knowledge of a legitimate device's design to produce a copy that behaves identically to an authentic device, as illustrated in FIG. 15C. Furthermore, the underlying PUF operation itself should be sufficiently complex that it is unreasonable to invert its behavior or predict a response to some arbitrary input, as illustrated in FIGS. 15D and 15E. Lastly, should an adversary tamper with a legitimate PUF, it should be evident through inspection or interrogation, as illustrated in FIG. 15F. Notably, these desired properties form direct parallels to the behavior of chaotic systems in that the behavior should be highly sensitive to initial conditions (i.e. both precise device structure and input challenge waveform), be of high complexity, yet be deterministic. For this reason, a PUF design based on reverberant silicon photonic micro-cavities that exhibit ray chaotic behavior, is described further herein.

Figure 16C:
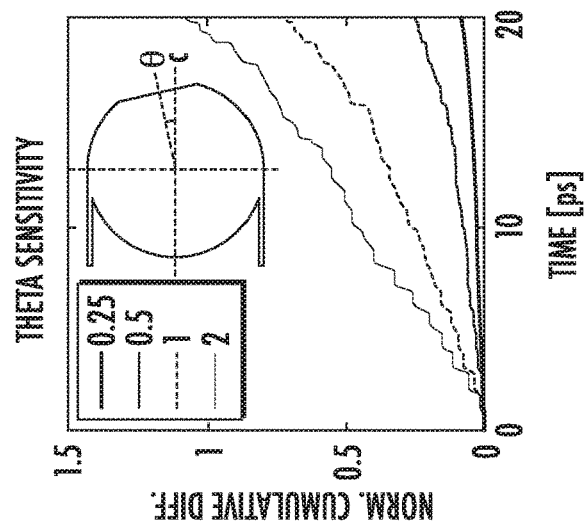
FIGS. 16A-16C illustrate an image and graphical views of photonic PUF design and simulation.
Figure 16B:
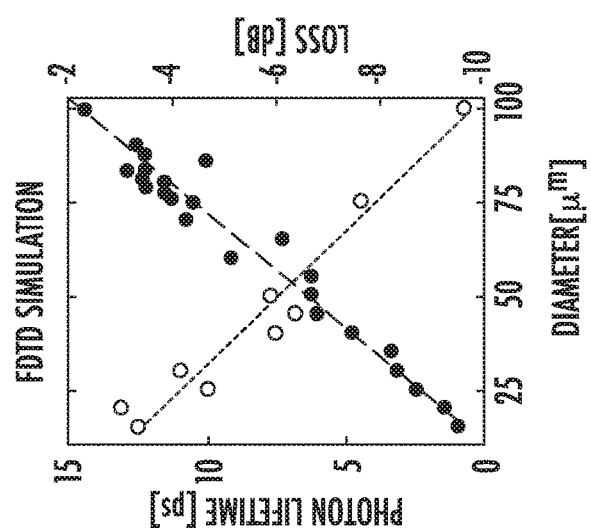
Figure 16A:
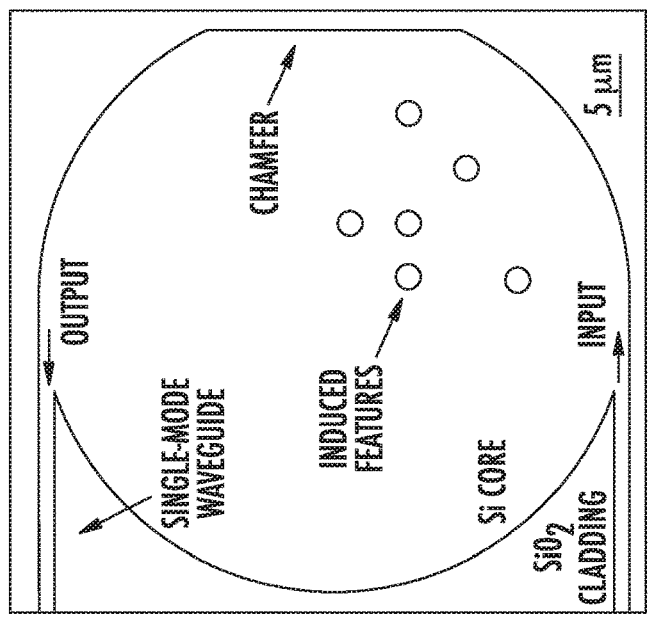

FIGS. 16A-16C illustrate an image and graphical views of photonic PUF design and simulation. FIG. 16A illustrates a scanning electron microscope (SEM) image of an example cavity. FIG. 16B illustrates a graphical view of photon lifetime and loss for a range of cavity diameters simulated with FDTD averaged over different chamfer positions and sizes. FIG. 16C illustrates a graphical view of baseline geometry was simulated via FETD with an input Gaussian envelope pulse of 100-fs FWHM at 1550 nm. Simulations of designs varying only by chamfer angle were performed with output intensity envelopes compared to the baseline geometry via a cumulative difference first normalized to the total summation of the baseline power samples after removal of exponential decay. The increased slope of each curve shows separation as a function of geometrical deviation, which agrees with chaotic behavior. The inset image shows the cavity geometry and coordinate system.

The photonic micro-cavity is configured as a disk with a chamfer, as illustrated in FIG. 16A, which, in dynamic billiards, is known to exhibit chaotic behavior. This ray-chaotic design is leveraged to make the device's behavior highly sensitive to structural idiosyncrasies (e.g. sidewall roughness, resist granularity, precise film thickness, material impurities) and therefore thwart cloning. In any real fabrication process, these device idiosyncrasies are inevitable and are precisely the information carrying structures that make each device unique. Beyond chaos, the property of nonlinearity can also increase the complexity of the relationship between system input and output, thus enhancing its unpredictability, one-wayness, and unclonability. In addition to the ray-chaotic design, the device is operated at sufficiently high optical power levels to exploit the natural nonlinearities of silicon. Finally, while extreme sensitivity to precise conditions is desired, reproducibility of the device behavior must also be ensured. To this end, single-mode silicon waveguides are used for optical coupling to and from the micro-cavity devices as seen in FIG. 16A.

To optimize a general baseline cavity design, a rapid evaluation of many potential cavity geometries is carried out by performing two-dimensional finite difference time-domain (FDTD) simulations over diameter, chamfer size, and chamfer location using the OptiFDTD solver from Optiwave Systems Inc, as illustrated in FIG. 16B. The solver is operated at a range of mesh resolutions (10-50 nm) that inversely scales with model size, which allows a rough evaluation of total power and photon lifetime. On the input bus waveguide, a mode excitor calculates supported modes using the effective index solver for both the transverse electric (TE) and transverse magnetic (TM) modes. Sensors were placed after the mode excitor on the input and output waveguides. Drude material models for silicon and silicon dioxide were used to generate the material properties and their associated response. A perfectly matched layer (PML) was used to impose a first-order absorbing Silver-Mueller boundary condition on all faces of the device.

Notably, there is a general tradeoff between interaction complexity and optical loss. Specifically, while larger cavity geometries produce longer photon-lifetimes and thus more potential complexity of behavior, they also exhibit increased loss from the input to the output waveguide. Likewise, smaller cavity geometries will exhibit decreased input-output loss but possess shorter cavity lifetimes and therefore less potential complexity of behavior. Ultimately, a 30-μm diameter baseline is used given the tradeoff between lifetime and loss.

To further investigate the baseline device design, high-accuracy two-dimensional finite element time-domain (FETD) simulations are used to model the ultrafast optical interaction within the micro-cavity using the Photon Design® OmniSim FETD solver. Through a convergence study on key metrics such as total power, photon lifetime, and peak-to-average power ratio (PAPR) of the output waveform, third-order elements with a nominal resolution of 300 nm are sufficient. This two-dimensional simulation of triangular elements was one finite element thick in the device y-direction (plane of calculation). A typical model was constructed with a mean physical element size of 34 nm and a minimum physical element size of 13 nm for a total of ~163,000 elements. Similar mode excitors, sensor placement, material models, and PMLs were applied as in the FDTD simulations. The sensitivity of the time-domain response to changes in geometry to confirm the ray-chaotic cavity behavior was assessed, as illustrated in FIG. 16C. Four different chamfer positions are simulated and the divergence over time of the ultrafast response waveforms produced by a 100-fs full-width half-maximum (FWHM) Gaussian input pulse are computed. The significant deviation of the waveforms, even for changes in position of the chamfer of less than a degree, demonstrate our designed device's sensitivity to small changes in cavity shape. Additionally, the increasing rate of divergence of the waveforms as a function of geometrical deviation indicates chaotic behavior.

Figure 17A:
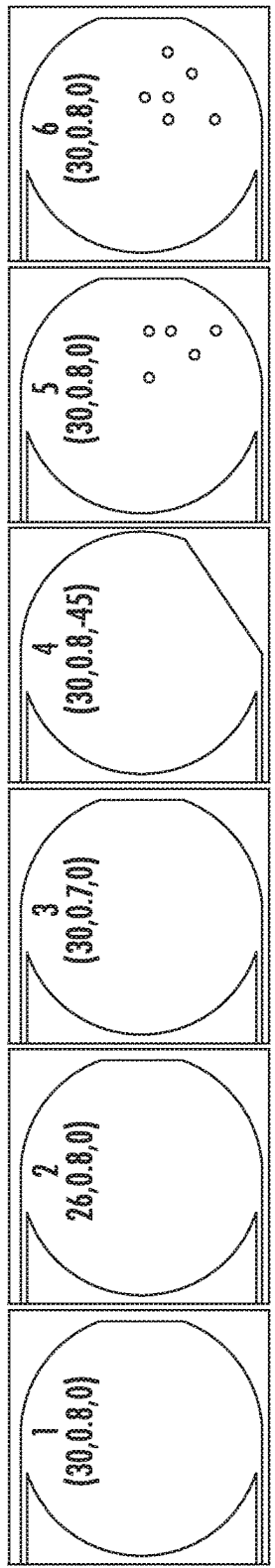
FIG. 17A illustrates SEM images of 6 prototype PUF designs with design parameters in parenthesis (diameter in microns, chamfer size as a factor of radius, and chamfer angle with respect to the unit circle).

Six device designs are shown in FIG. 17A. FIG. 17A shows single-crystal silicon-on-insulator (SOI) wafers with a 500-nm thick top silicon layer, a 3-μm buried oxide layer, and a 500-μm silicon substrate. The top silicon layer is thinned to a thickness of 220-nm in two steps of thermal oxidation, followed by removal of oxide via hydrofluoric acid etch. The second acid etch was terminated early in order to leave a 100-nm thick layer of thermal oxide to serve as a hard mask during the subsequent etching process. MaN-2405 negative tone electron-beam resist is then used to pattern the devices with electron beam lithography (EBL). The EBL tool (Joel JBX-6300FS) writes patterns of 8 nm or less, leveraging a 2.1 nm beam at a 100-kV accelerating voltage. The EBL tool has a high-precision stage that employs beam-positioning digital-to-analog conversion (DAC) of 19 bits with 0.125 nm resolution and laser interferometer with 0.6 nm resolution, which achieves a writing positional accuracy of 9 nm or less for small fields to large-area fields. After development, the device patterns are transferred to the silicon dioxide layer through reactive-ion etching, which then serves as a hard mask for the following reactive-ion-etching step that transfers the device pattern into the silicon layer. The devices are clad with a 1-μm layer of silicon dioxide with plasma-enhanced chemical vapor deposition. Finally, the wafers are diced to separate individual dies, and the edge facets are polished using fine grit diamond film in preparation for edge coupling via tapered single-mode fibers (SMF).

All of the fabricated devices are perturbations on a 30-μm diameter disk cavity with a chamfer. Each design differs from at least one other in exactly one parameter including size and position of the chamfer, as well as the presence or absence of arbitrarily positioned holes within the cavity, as illustrated in FIG. 17A. This makes it possible to isolate the effects on device behavior to a single parameter. Two copies of every cavity are fabricated on the same SOI die, located as close together as possible, and created in the same fabrication run, to minimize variations and permit analysis of PUF clonability.

Figure 17C:
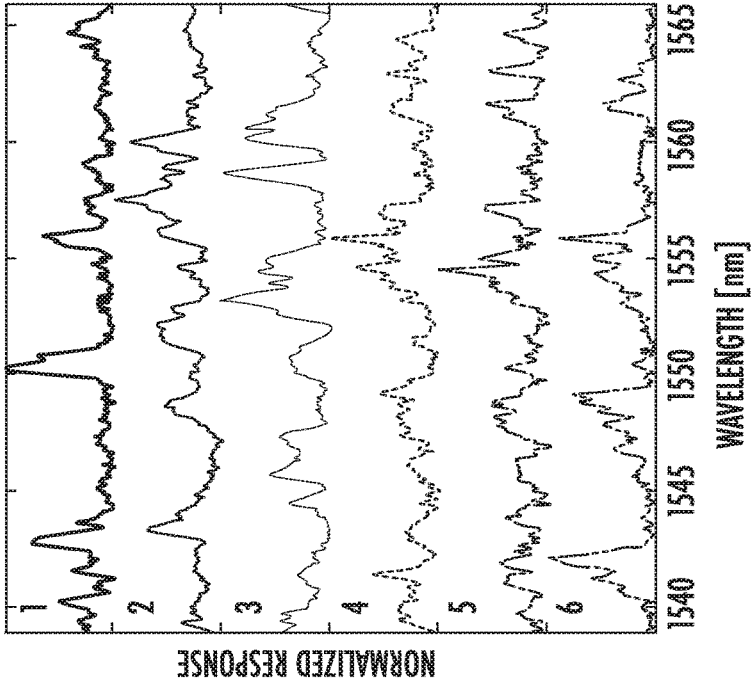
FIG. 17C illustrates a graphical view of a normalized spectral transfer-function magnitude for the same experiment.
Figure 17B:
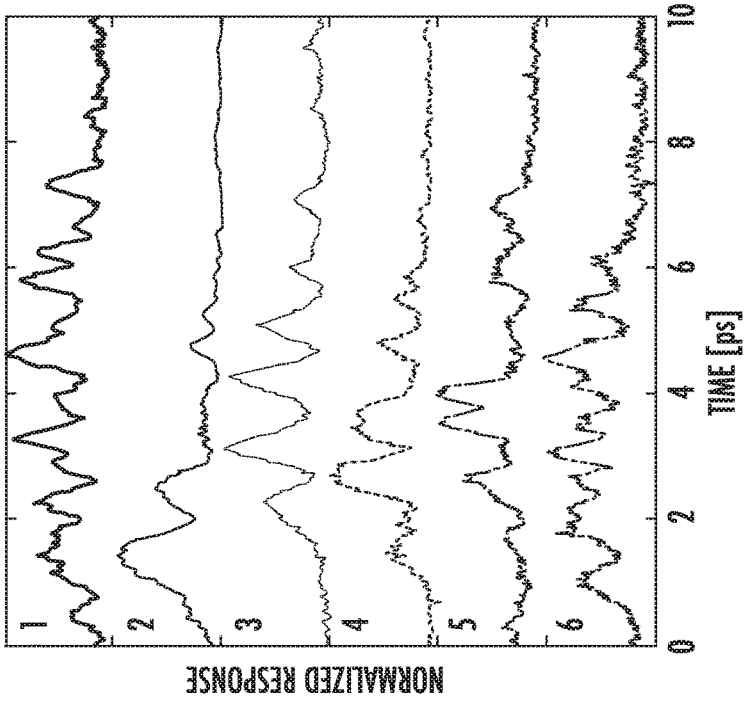
FIG. 17B illustrates a graphical view of normalized time-domain impulse response measured using cross-correlation with a sinc pulse (175 fs FWHM) for cavities 1-6 shown in order top to bottom.

FIG. 17A illustrates SEM images of 6 prototype PUF designs with design parameters in parenthesis (diameter in microns, chamfer size as a factor of radius, and chamfer angle with respect to the unit circle). FIG. 17B illustrates a graphical view of normalized time-domain impulse response measured using cross-correlation with a sinc pulse (175 fs FWHM) for cavities 1-6 shown in order top to bottom. FIG. 17C illustrates a graphical view of a normalized spectral transfer-function magnitude for the same experiment.

The spectral and temporal impulse response of each fabricated cavity to an ultrashort input pulse is measured using an optical spectrum analyzer (OSA) and an ultrafast optical cross-correlator, as illustrated in FIG. 17B. The 175-fs input optical pulse is generated by spectrally broadening a 90-MHz repetition rate mode-locked laser (MLL) source via a normal dispersion fiber followed by a spectral filter. Finally, it is temporally compressed by a programmable spectral filter to create nearly transform-limited sinc-shaped pulses with 5 THz of bandwidth (175-fs) traveling into the cavity. A fiber splitter diverts 80% of the optical power to the photonic device and 20% to the reference arm. A polarization controller and tapered fiber are used to couple into the silicon bus waveguide that then feeds the photonic cavity; the response from the cavity is coupled out of the chip through the output silicon bus waveguide, collimated with a high-numerical aperture aspheric singlet and passed through a linear film polarizer to select the desired polarization state. This response is then amplified by an erbium-doped fiber amplifier (EDFA) before reaching the cross-correlator. Chromatic dispersion due to the single-mode fiber (SMF) in the two arms of the system (the device under test and the reference arm), is compensated up to the free-space inputs to the cross-correlator for optimal temporal resolution. As anticipated, each cavity exhibits unique spectral and temporal impulse response behavior, and small changes in cavity geometry induce distinct behaviors as shown in FIGS. 17B and 17C.

Figure 18A:
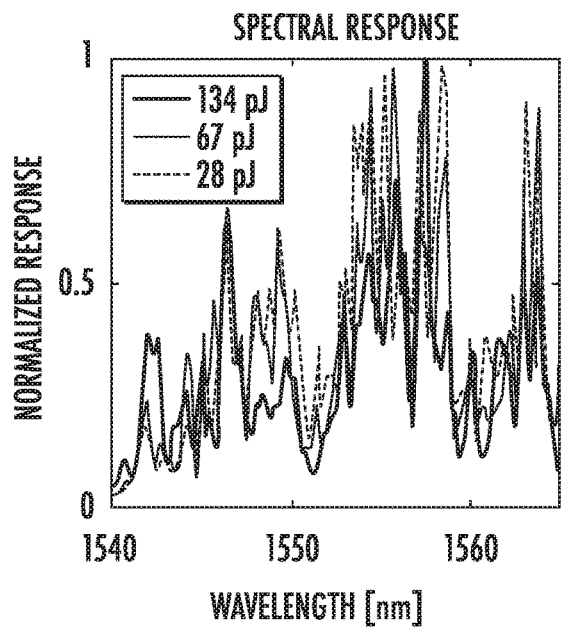
FIGS. 18A-18D illustrate graphical views of observed nonlinear effects in the photonic PUF.

To characterize the presence of optical nonlinearity, the change in the output spectrum is observed as a function of input pulse energy, taking steps to ensure the invariance of the input laser spectrum, as illustrated in FIG. 18A. A ~175 fs FWHM input pulse is amplified from the 90-MHz MLL and associated compression stages and use a programmable spectral filter as a variable attenuator to evaluate the different power levels. As shown in FIG. 18A, distinct variations are seen in the spectral impulse response as a function of pulse energy, thereby verifying that the photonic PUF is operating in a nonlinear regime.

Figure 18B:
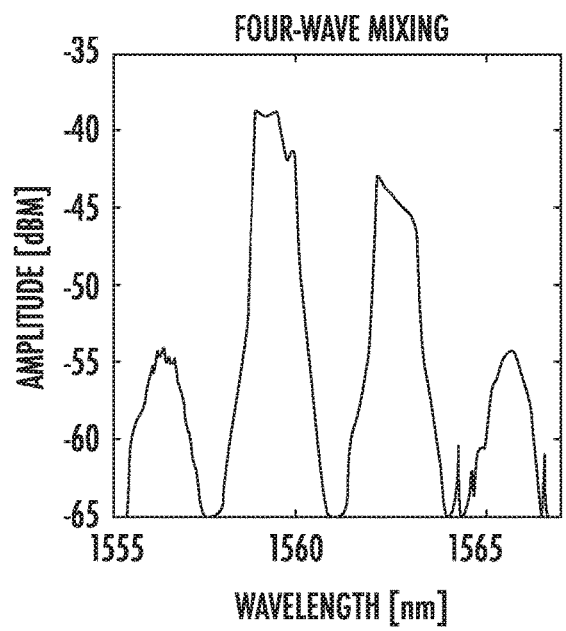
Figure 18C:
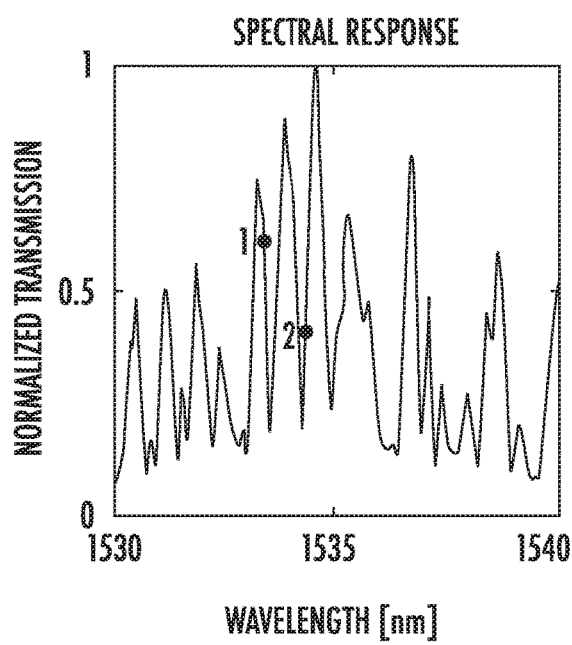
Figure 18D:
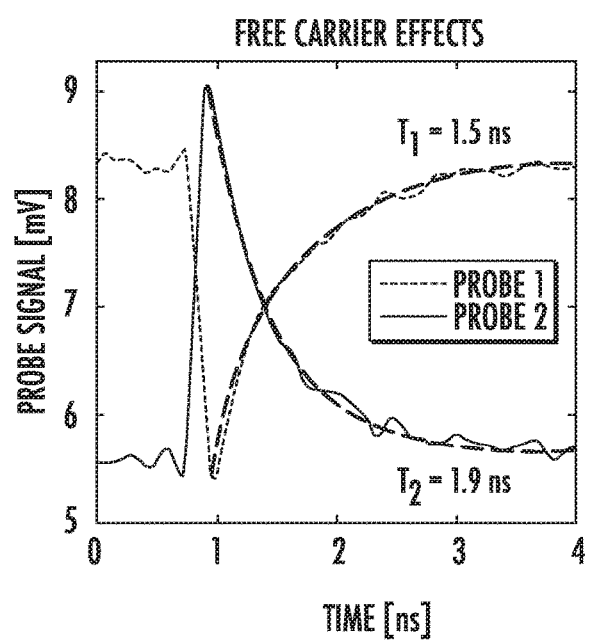

FIGS. 18A-18D illustrate graphical views of observed nonlinear effects in the photonic PUF. FIG. 18A illustrates a graphical view of nonlinear power dependence of a normalized spectral transfer-function magnitude of a prototype cavity in response to different excitation pulse energies (28 pJ, 67 pJ, and 134 pJ). FIG. 18B illustrates a graphical view of an input signal consisting of two 6.7-ps 50-pJ pulses centered at $\omega 1=191.94$ THz and $\omega 2=192.43$ THz are sent through the silicon cavity. Two new lightwaves at frequencies, $\omega 3=191.57$ THz and $\omega 4=192.80$ THz, as expected for a FWM process. FIG. 18C illustrates a graphical view of a spectral location of two probe measurements on typical device spectral response. FIG. 18D illustrates a graphical view of temporal responses of the two probes showing free carrier dispersion effects.

There are several origins of this nonlinear behavior. In silicon devices, nonlinear effects are known to include self-phase modulation (SPM), two-photon absorption (TPA), four-wave mixing (FWM), stimulated Raman scattering (SRS), and free-carrier induced absorption and dispersion and these spectral changes are a result of a combination of these mechanisms. For example, the presence of FWM in a typical prototype device is shown by inputting two 6.7-ps pulses at different wavelengths and observing the generation of FWM sidebands (FIG. 18B). Further, TPA in silicon is well known to generate free carriers, which introduce loss and change the refractive index. The presence of TPA generated free-carriers and the resulting free-carrier absorption (FCA) and free-carrier dispersion (FCD) in this device is shown via a pump-probe measurement. In this case, the pump is a 3.5-ps 300-pJ pulse from the 90-MHz MLL sent through a 100-GHz bandpass filter and the probe is a tunable continuous-wave source. By illuminating the cavity with the pulse, free carriers are generated in the cavity which induce absorption and shift the cavity's resonance through FCD. The probe is placed at two spectral locations on the cavity's spectral response that provide the greatest sensitivity to such a resonance shift and observe the temporal responses (FIGS. 18C and 18D). The positive and negative slopes of the spectral response at these probe wavelengths yield inverted temporal responses as expected. From this measurement, the free-carrier lifetime of a typical cavity is found to be 1.9 ns. These effects demonstrate the system's intricate spectro-temporal interaction, which provides unpredictability, one wayness, and unclonability.

Figures 19A, 19B:
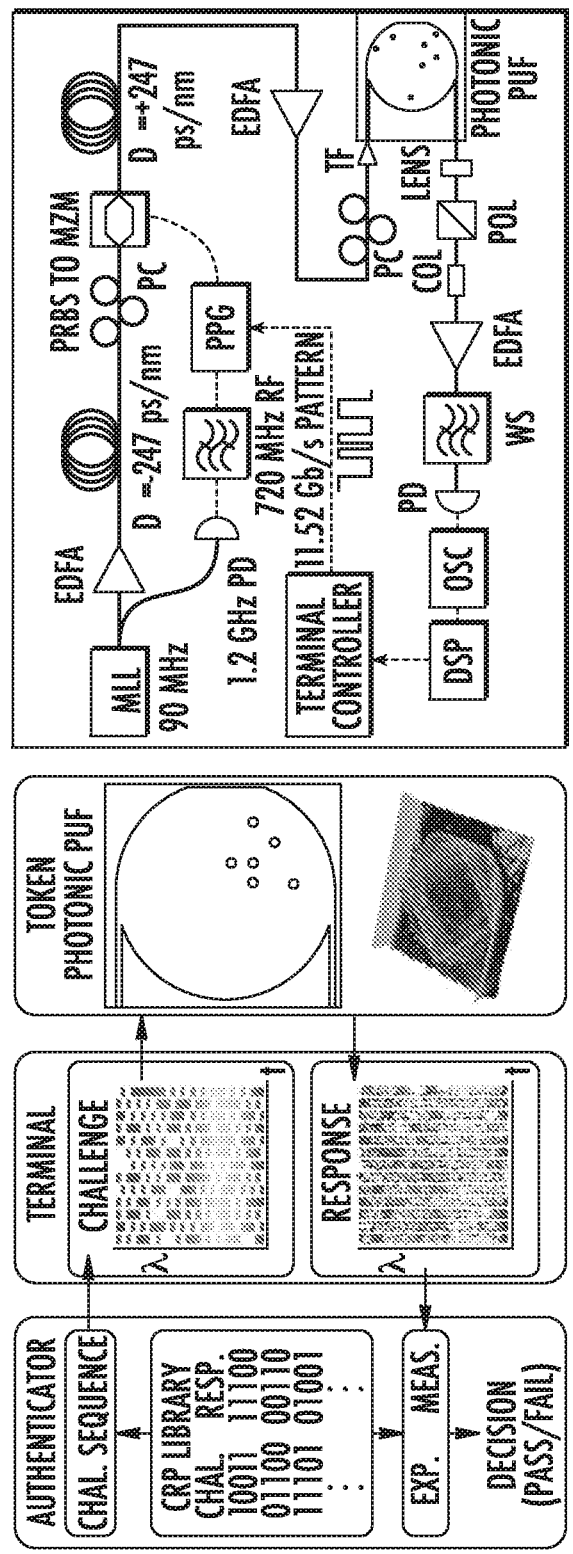
FIGS. 19A and 19B illustrate schematic views of an authentication system and experimental setup.

To demonstrate the potential of this photonic PUF for applications in information security its use as an authentication token (a hardware device that is used to prove an identity and authorize access to a protected resource) is investigated in a challenge-response authentication system. As depicted in FIG. 19A, a challenge-response authentication protocol that interrogates the micro-cavity token with a sequence of spectrally-encoded ultrashort optical pulses, termed "challenges" is used. The optical response from the cavity is then passed through a programmable spectral filter and the total transmitted pulse energy is measured using a photodetector. The challenge pulse and a binary sequence derived from the optical response pulse constitute a challenge-response pair (CRP) and a sequence of CRPs is extracted to determine the authenticity of the cavity.

FIGS. 19A and 19B illustrate schematic views of an authentication system and experimental setup. FIG. 19A illustrates a schematic view of an authentication system constructed from an authenticator, a terminal, and a token. A token is authenticated through interrogation by some challenge and comparing its measured response to an expected response that was previously measured. FIG. 19B illustrates a schematic view of an experimental setup of authentication system demonstration. Pulses from a MLL are amplified, temporally stretched, and encoded with a binary sequence from a pulse pattern generator (PPG). The pulses are compressed, amplified, and sent through the cavity. The responses are amplified, sent through a programmable spectral filter (WS) to extract a subset of information from each spectral response, and detected via photo-diode (PD). The outputs are converted into binary sequences through a post-processing algorithm.

To generate the challenge pulse sequence, a novel ultrafast pulse encoder is implemented as follows (FIG. 19B): dispersion compensating fiber (DCF) stretches each 300-fs MLL pulse (90-MHz repetition rate) to greater than 11 ns. The temporally dispersed spectrum is amplitude encoded by a length 128 pseudorandom binary sequence (PRBS) at 11.52 Gbit/s that is synchronized to the MLL. There is some overlap between time stretched pulses at this stage and thus neighboring pulses share some temporal features. However, they are mapped to different wavelengths and thus involve different parts of the pattern. This allows the patterns on each pulse to remain incoherent while providing more features on each pulse. 94 features are achieved within the 3-dB bandwidth of each pulse. After spectral patterning, the pulses are compressed to 6 ps using standard single-mode fiber. Using this approach, a challenge sequence of 8550 uniquely encoded pulses is generated. This sequence is amplified with an EDFA to an average power of 64 mW and coupled into the chip. The output response pulses are amplified using a second EDFA and a spectral measurement is performed by passing the response pulses through a pseudorandom spectral amplitude mask and detecting the transmitted pulse energy. The spectral mask is implemented using a programmable spectral filter with 296 random features within the optical bandwidth and the response pulse energies are recorded at the 90-MHz pulse rate. The input pulse bandwidth (1535-1575 nm) was not perfectly aligned with the spectral filter used in the experiment (1527.4-1567.5 nm), thus some of the spectrally-encoded information was lost. The pulse energies were recorded with an analog-to-digital convertor (ADC) that could store over four million samples and was synchronized to the MLL. Notably, this high-throughput approach results in a key generation rate of up to 180 Mbps, which is a two order of magnitude improvement over previous work on optical scattering PUFs.

Figure 20:
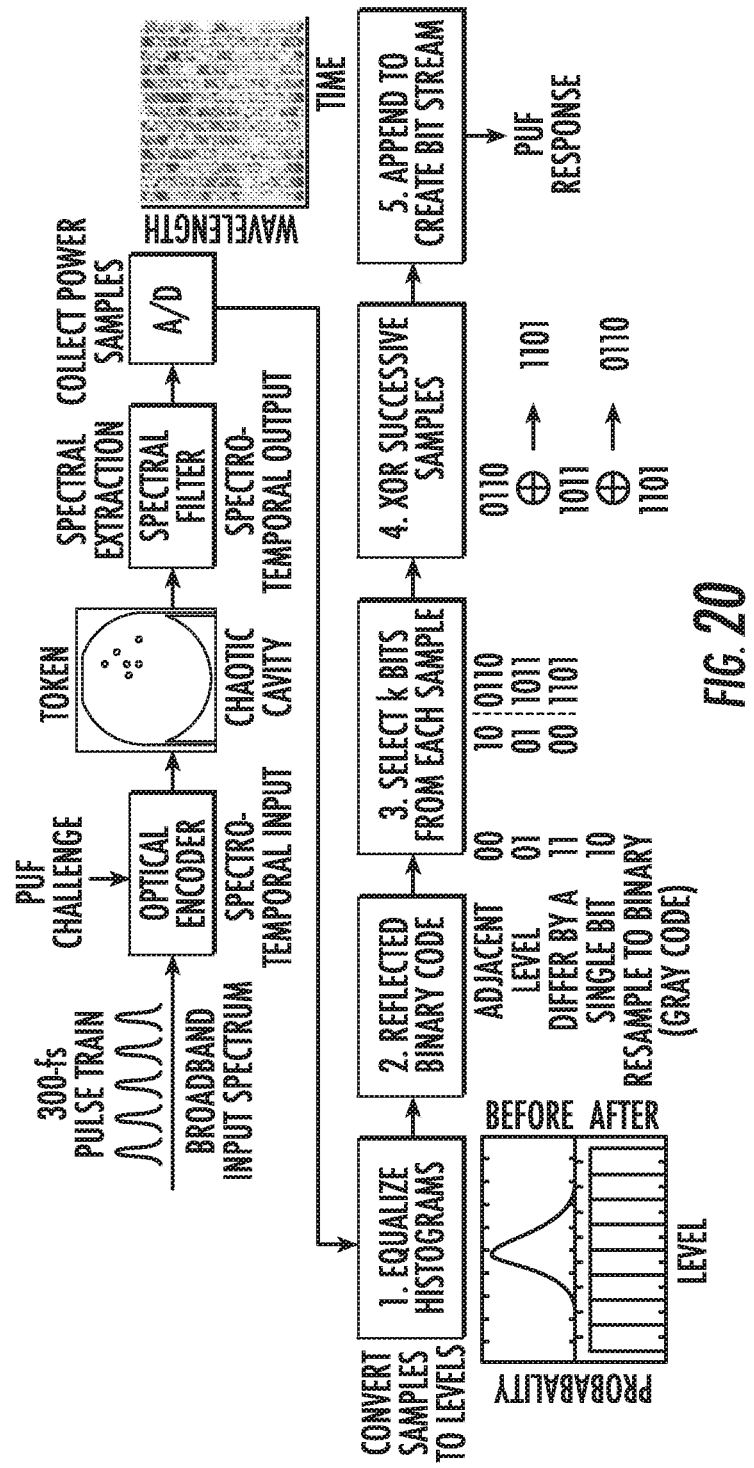
FIG. 20 illustrates a schematic diagram of optical system elements and digital post-processing steps to convert spectro-temporal responses into binary sequences.

FIG. 20 illustrates a schematic diagram of optical system elements and digital post-processing steps to convert spectro-temporal responses into binary sequences. The response pulse energies are transformed into a binary sequence though an algorithm that enhances its indistinguishability from a true random binary sequence. A probability density function (PDF) is calculated for the response energies and used in a histogram equalization algorithm to calculate non-uniform levels that will make any subsequently collected responses equiprobable when converted to binary. These non-uniform detection levels corresponding to each device are stored as helper data and are used in future challenge-response exchanges to aid in binary conversion. Using a reflected binary code (Gray code) in which adjacent levels differ by only a single bit, the power samples are then discretized and converted to binary for a specified number of resampled bits. An exclusive-or (XOR) operation is performed on adjacent sequences to enhance complexity. A number of least significant bits (LSBs) are kept from each sample and appended together to create a single bit sequence ranging from 8,550 to 51,300 bits. The resampling bits and the number of kept LSBs are optimized to minimize authentication error.

A challenge-response library (CRL) is built by averaging 460 analog response sequences from a specific token to the challenge sequence and calculating the resulting binary response sequence of this average response using the previously calculated non-uniform detection levels (helper data). In order to authenticate a key, the authenticator selects at random a set of CRPs from the CRL, sends this challenge sequence to the token, and measures the response sequence in a single shot without averaging. This rapidly acquired binary sequence is compared to the CRL and the fraction of positions in which the sequences differ (the "fractional Hamming distance," or FHD) is employed as a metric to determine authenticity. The authenticator compares the FHD to a predetermined threshold to decide whether to accept or reject the key.

A histogram of the 460 FHDs between each individual response of a given device and the CRL for that device is calculated and forms the "same" distributions in FIGS. 21A-21C. The histogram of FHDs between each of those same responses and the CRL of a cavity of different design forms the "different" distributions in FIGS. 21A-21C. FIGS. 21A-21C illustrate graphical views of experimental authentication results. FIG. 21A illustrates a graphical view of the normalized FHD distributions and histograms for design 2 for a two LSB operating condition at a resampling of three bits post-ADC collection. The distribution representing an authentication attempt after 48 hours is also shown. FIG. 21B illustrates a graphical view of a normalized FHD distributions for binary responses from same designs, different designs, and clones at the same operating conditions as FIG. 21A. Authentication after 48 hours shown for design 1 and 2. Error bars represent ±6 standard deviations. FIG. 21C illustrates a graphical view of the FAR and FRR versus decision threshold for the aggregated set of experimentally tested cavities at the TE polarization. The Minimum Error Point (MEP) and Equal Error Point (EEP) are shown the same operating conditions as previous.

The distance between these distributions indicates the system's ability to discriminate between legitimate and illegitimate tokens. For each distribution, the mean and standard deviation are calculated and are presented for 6 prototype cavities in FIG. 21A. Binomial distributions are fit to each of the histograms, and an optimum decision threshold is computed between them to minimize the total authentication error probability, which is the sum of the false acceptance rate (FAR) and the false rejection rate (FRR). The probability of error generally increases with a decrease in the number of least significant bits (LSB) retained from each response in our post-processing algorithm. Retaining two LSBs with three-bit resampling gives a total error probability of roughly 10-21 of incorrectly accepting or rejecting a key for the experimentally investigated key length of 17.1 kb across distributions generated from all experimentally evaluated prototypes. Notably, the small FHD of the "same" distributions indicate the reproducibility of the different designs' responses to identical challenges. Further, the closeness of the "different" distributions to a FHD of 0.5 indicate the uniqueness of the different designs' responses to identical challenges. The "clone" distribution (FIG. 21A) is generated by computing the FHD between the responses of a given cavity and the CRLs generated by the other cavities of identical design. Notably, this distribution closely aligns with the "different" distribution and the FAR for the cloned cavity is roughly 10-18 for a 17.1-kb key length across distributions generated from all interrogated prototype cavities, clearly demonstrating the devices' unclonability resulting from the sensitivity of their response behavior to fabrication variations.

Finally, a repeatability over time experiment was performed to determine the overall stability of the system. First, a typical authentication token was enrolled to generate a reference CRL for the first day. A key verification process was performed to determine the intra-distance or "same" distribution for that day to quantify its repeatability. The same key verification process was performed 48 hours later against the CRL generated on the first day to determine the shift in the mean of the FHD distribution. It was not attempted to account for or adjust the temperature and humidity conditions between the measurements within the laboratory and power levels were generally kept within 0.3 dB between days. On the first day, the temperature was 20.8 C with a humidity of 63%. During the second measurement, the temperature was 20.6 C with a humidity of 71%. Further, the entire laboratory setup was fully deconstructed and reconstructed in between measurements. As shown in FIGS. 21A-21C, the results indicate a clear repeatability of the system over time.

The security of this PUF is a result of the interaction complexity, nonlinearity, and ultrafast response speed. An adversary wishing to spoof the device has three options: direct cavity replication, or emulation using optoelectronic or computational means. As clearly shown here, the precision of nanofabrication technology combined with the extreme sensitivity of the device's behavior to cavity structure prevents direct cavity replication.

Beyond direct duplication, the device's nonlinearity and ultrafast (sub-20-ps) response time prevent optoelectronic cloning using, for example, a programmable spectral filter (e.g. 4-f pulse shaper), due to the shaper's inability to accurately recreate the nonlinearity of the cavity and its increased latency. Finally, even with complete knowledge of the CRL, to successfully emulate the device an adversary would need to measure an incident challenge, perform the necessary computations (through a lookup table or transform), and generate the appropriate response in a time interval faster than the device response time of 20 ps. Not only is this significantly shorter than a modern computer clock cycle, but given that information cannot travel faster than the speed of light, any such computational system (processor, memory, etc.) would need to be physically as small as the device. These stringent constraints prevent such an emulation approach with current or any foreseeable computational resources and, as one example, would require memory densities that are many orders of magnitude higher than the current state-of-the-art.

The probability of incorrectly accepting or rejecting a token based upon a 17.1-kb key is roughly 10-21 and the probability of falsely accepting a cloned token is roughly 10-18. Notably, the system showed high repeatability after a 48-hour period by yielding similar error rates (FHD of 0.1) when compared to the same cavity authenticated at the time of CRL generation.

Information security is of paramount importance to an information-centric society and demands continual innovation to address the evolving threats. Here a silicon photonic PUF is demonstrated, which is the first optical PUF that is directly compatible with electronic fabrication processes and telecommunications infrastructure. This photonic PUF can bring the security benefits of optical PUFs to practical applications in electronic circuits. Due to their speed, simplicity, compactness, low-cost, and technological compatibility, these photonic PUFs can find application in a range of authentication technologies including mobile devices, computers, smart tokens, credit cards, and secure data storage devices. Furthermore, the scalability of silicon photonic integration indicates that a large number of these devices can form an interconnected system to further increase the optical interaction complexity and thus security. Additionally, due to the key extraction speed and compatibility with both electronics and optical communications, the security afforded by these devices can be readily extended beyond authentication to, for example, circuits for tamper awareness, encrypted information storage, and encrypted high-speed communications.

Another exemplary embodiment of the present invention includes an information-theoretically secure symmetric block cipher based on the fuzzy extraction of key material from a sub-mm, ultrafast, nonlinear photonic micro-cavity PUF fabricated in a planar silicon photonic chip. These devices are compact, inexpensive, and directly compatible with electronic integration and circuitry. The micro-cavity is designed using a shape (a disk with a chamfer) that exhibits reverberant ray-chaotic behavior such that when it is optically probed, the optical waveform emanating from the cavity is complex, extremely sensitive to both the properties of the optical probe and to the precise physical cavity structure, and, while deterministic, is not accurately predictable.

To extract key information the micro-cavity is illuminated with a sequence of ultrashort optical pulses (see FIGS. 22A-22C) each encoded with a unique spectral amplitude pattern. Each pulse excites many spatial optical modes that interact with the fine-scale structure of the cavity and with each other via the optical nonlinearity of silicon. Due to the nonlinear chaotic cavity design each solitary pulse can extract an exclusive set of information from the cavity. This results in a sequence of lightwave responses each of which contains independent information-carrying ultrafast spectro-temporal characteristics. To extract information from these responses, the output lightwaves are passed through a pseudorandom spectral amplitude mask and the transmitted energy of each response is integrated and measured by a lower bandwidth photodiode. A binary response sequence is then computed from the measured response energy sequence using a post-processing algorithm.

Figure 22A:
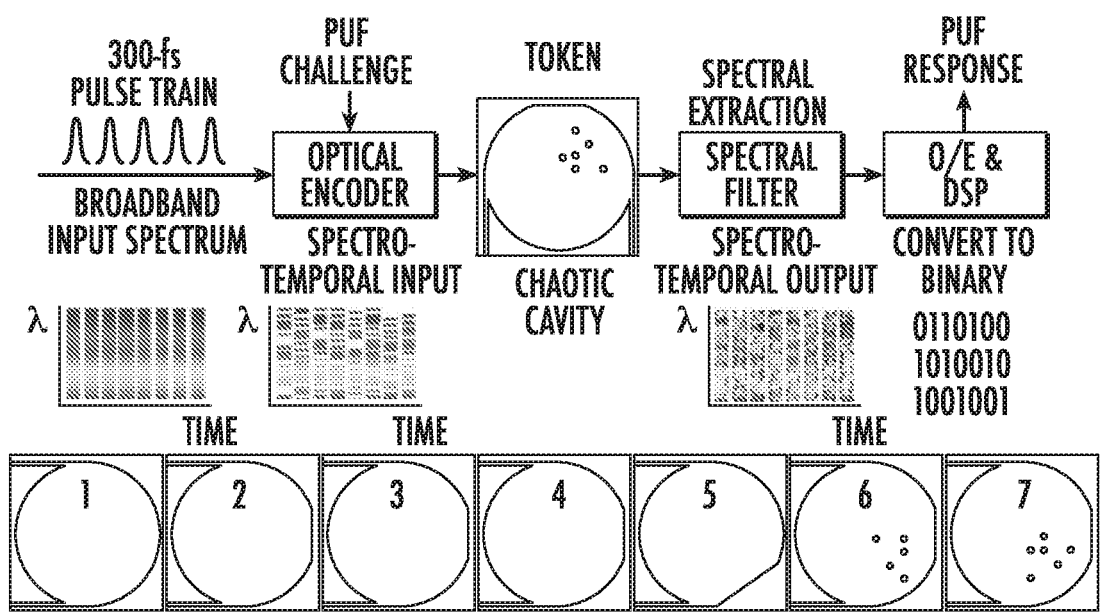
FIGS. 22A-22C illustrate operation of the photonic PUF.
Figure 22B:
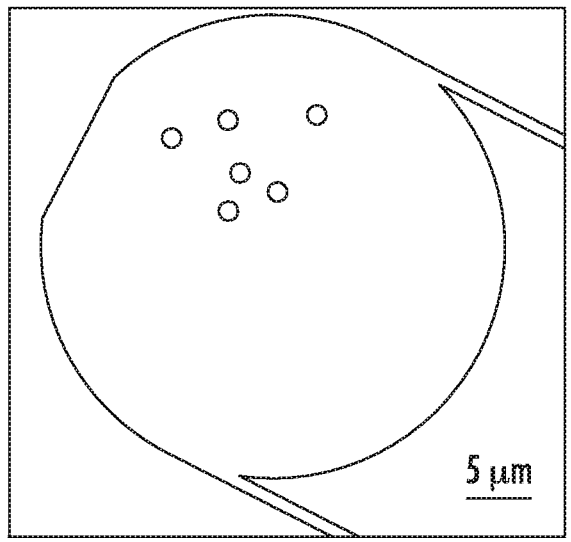
Figure 22C:
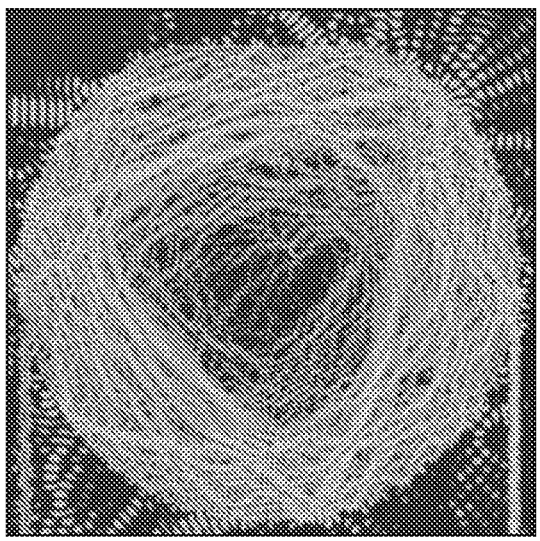

FIGS. 22A-22C illustrate operation of the photonic PUF. FIG. 22A illustrates a schematic diagram of binary sequence sent to an optical encoder to generate a spectro-temporally encoded pulse sequence, which is sent into the photonic PUF. The complex response sequence generated by the cavity is passed through a programmable spectral filter and is then detected. A series of digital signal processing steps are performed before sending the binary response to a fuzzy extractor. Scanning electron microscope (SEM) images of the seven prototype designs are shown. FIG. 22B illustrates a larger SEM image of a typical prototype device. FIG. 22C illustrates a finite element time domain (FDTD) image detailing the excitation of many transient optical modes within the cavity.

A secure communication channel is implemented between two parties, Alice and Bob, each of whom possesses a distinct photonic PUF, as outlined in FIGS. 23A-23C. In order to communicate, they synchronize their photonic PUFs to generate a shared key by first meeting physically or over a known secure channel. This process also generates public helper data that aids in key recovery, but does not reduce the security of the system. In order to send a message, Alice reconstructs her private key, uses it to encrypt a message of equal length, and sends the ciphertext over a public communications channel. Bob reconstructs his private key and performs an exclusive-or (XOR) operation with a previously generated shared key to recover Alice's private key. Bob then uses this key to recover the original message. Alice and Bob would communicate until their key space has been exhausted at which time they would generate more shared key material. This communications protocol can be enhanced by requiring authentication prior to granting access to the public dictionary to mitigate denial of service attacks.

This scheme is composed of three building blocks: an extractor, a secure sketch, and a reconstructor (FIGS. 23A-23C). The extractor withdraws information of uniform randomness from its input, the photonic PUF response. The secure sketch creates public information from its input that does not reveal the input, which allows the reconstructor to fully reconstruct the original input from input that is reasonably close to the original. The cipher is applied to blocks of PUF key material and thus if the PUF response is not reconstructed to a predetermined error threshold, no portion of the message in that block is recovered. In the dictionary setup protocol, the fuzzy extractor is used to generate keys for public storage, while in the communications protocol, a fuzzy reconstructor is used to recover the original key from a noisy key.

A public dictionary composed of input patterns, shared keys, and helper data is generated for each combination of singular PUFs that wish to communicate. First, several responses from $PUF_A$ from single input pattern, $p_i$, are averaged together prior to binary conversion to form an averaged PUF response, $\langle w_i \rangle$ corresponding to the $i^{th}$ block, e.g. $\langle w_i \rangle = \langle PUF_A(pi) \rangle$. A random BCH codeword, $k_i$, is selected for each block to generate $r_i$ and is XORed with the averaged PUF response to generate the helper data $s_i$. Within the fuzzy extractor, the averaged PUF response is XORed with a randomly generated seed, $x_i$, and then input into a SHA-256 hash function to generate $\langle R_i \rangle$. Likewise, the same process follows for the second PUF to generate $\langle R_j \rangle$, $s_j$, and $x_j$. A shared key is generated by XORing $\langle R_i \rangle$ with $\langle R_j \rangle$.

FIG. 23A illustrates a schematic view of a fuzzy extraction PUF communication protocol. Two endpoints, A and B, each have a unique photonic PUF. A fuzzy extractor is applied to the response sequence derived from PUF A to recover a specific block of key material with the help from data in a public dictionary. A message is encrypted via digital exclusive-or (XOR) with that key and is sent through a public channel. Endpoint B recovers their unique key in the same manner as A. The key from A is recovered by B via digital XOR with a previously constructed shared key. This recovered key from A is used to recover the message from the ciphertext via digital XOR. FIG. 23B illustrates a schematic view of a generation procedure. A challenge p interrogates the PUF resulting in a binary response w, which is sent into the secure sketch (SS) and extractor. The SS takes w and a random value r to generate helper data s. The extractor ingests w and a random value x to produce key R. Both s and x are stored in a public dictionary as helper data. FIG. 23C illustrates a schematic view of a reconstruction procedure. Challenge p interrogates the PUF which produces w' which may be different than w given noise. The reconstructor takes helper data s and response w' to reconstruct w which the extractor uses, with helper data x, to reproduce key R.

To encrypt a message, Alice will recover her key by querying her PUF and recording a response sequence, e.g. $w_i = PUF_A(pi)$ which is then combined with the helper data, $s_i$, to recover some possibly corrupted $r_i' = w_{i(+)}s_i$, as wi may not be equal to $\langle w_i \rangle$. A BCH decoder recovers $k_i$ perfectly if $w_i \approx \langle w_i \rangle$. A BCH encoder attempts to recover r, from $r_i'$. The errors in the PUF response are corrected and the averaged response is recovered by XORing $s_i$ and $r_i$. If $w_i$ differs from $\langle w_i \rangle$ by beyond the code's correction capability, a partially recovered $w'_i$ will be the result. The response is XORed with the random seed $x_i$ and hashed to form $R_i'$. The message, m, is XORed with $R_i'$ to form the ciphertext, c. To decrypt the ciphertext, Bob follows the same recovery process to recover his key, $R_j'$. Bob then XORs $R_i'$ with the shared key, $k_{ij}$, to recover a variant of Alice's key, $R_i''$. Bob then XORs Alice's recovered key with the ciphertext to recover the message, e.g. $m' = c(+) R_i'' = m(+) R_i'(+) \langle R_i \rangle (+) \langle R_j \rangle (+) R_j'$. The message is recovered without error, m'=m, if and only if $w_i \approx \langle w_i \rangle$ and $w_j \approx w_j$.

In order to exploit this scheme for secure communications, the associated security requirements are defined. The unconditional security for an OTP protocol is guaranteed only if the message is mixed with a random key and never reused. The output of a suitable hash function is sufficient for use as statistically random key material and that the reuse requirement may be met with proper protocol design and execution. The security of this approach does not depend on the security of any electronically stored data as all such data can be made public without loss of security. The adversary must not be able to efficiently copy or model the operation of the PUF. The unclonability of photonic micro-cavity PUFs has been demonstrated, which is verified for the system conditions here and satisfies this requirement. Further, entropic-security, i.e. with an observation of some ciphertext, an adversary will not be able to compute any predicate on the ciphertext with meaningfully larger probability than an adversary who does not possess the ciphertext, is guaranteed only if the target data has high entropy. The PUF binary responses are of high entropy and are mixed with pseudo-random numbers within the fuzzy extraction process while cryptographic hash function outputs are exploited as high entropy keys for use in a modified OTP protocol.

Figure 24A:
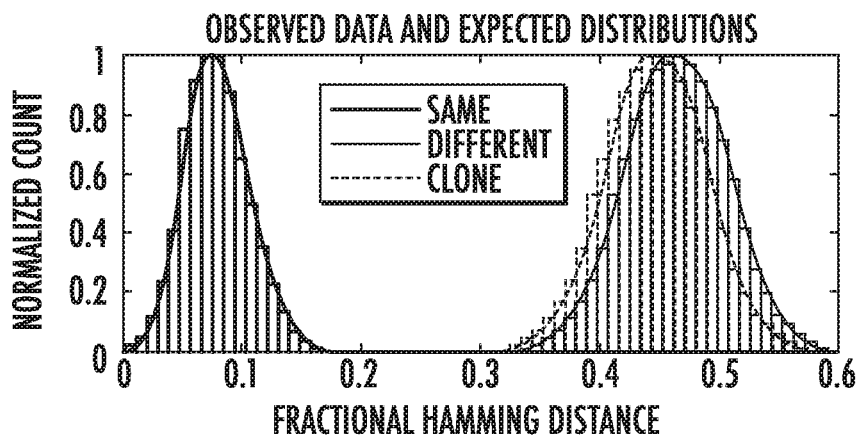
FIGS. 24A-24C illustrate graphical views of communication system performance.
Figure 24B:
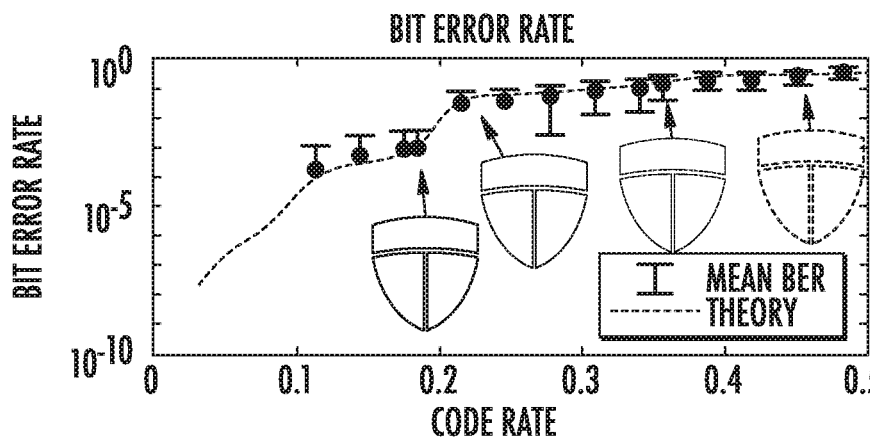
Figure 24C:
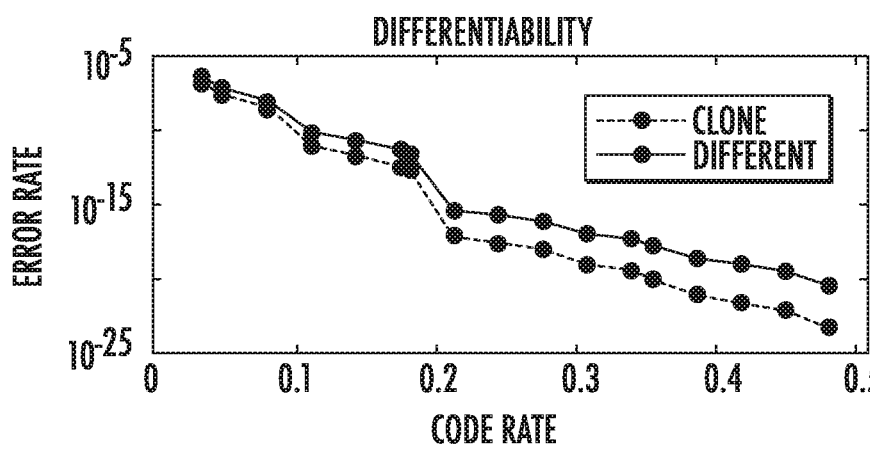

FIGS. 24A-24C illustrate graphical views of communication system performance. FIG. 24A illustrates a graphical view of a normalized FHD binomial distributions and histograms for binary responses from same, different, and cloned designs resampling to three bits post-analog-to-digital (ADC)collection. All responses were generated from the Transverse Electric (TE) polarization state. FIG. 24B illustrates a graphical view of the mean experimental and theoretical BER is shown for 57 combinations of different devices communicating a message in the form of a test image of 25,575 bits at various BCH code rates. The upper and lower bars indicate a two standard deviation bound relative to the mean BER. Lower bounds for low code rates are not shown due perfect message reconstruction. The inset images show the recovered message at different code rates (university seal). FIG. 24C illustrates a graphical view of probability that a clone or differently designed device could create responses reasonably close to the original to be correctable by code rate.

The robustness of the approach is demonstrated by interrogating 22 prototype photonic micro-cavity PUFs fabricated using electron beam lithography (EBL) to create silicon cavities embedded within a silicon dioxide cladding. The silicon layer thickness is 220 nm and the cavities are roughly 30 µm in diameter. The specific cavity designs are given in Supplement 1. Two chips each with seven unique designs (see FIGS. 22A-22C) and two copies of each design with some attrition were characterized.

The photonic PUFs are probed with a sequence of 8550 uniquely patterned ultrafast optical pulses (90-MHz pulse rate). The optical response sequence from the cavity is passed through a spectral mask with 296 features across the optical bandwidth and the transmitted analog response energy sequence is measured using a photodetector and ADC. The three most significant bits (MSBs) of each measured response energy are kept and concatenated to form a 25,650-bit binary response sequence. The binary sequence is decomposed into 100 blocks of 255 bits and inserted into a fuzzy extractor, which produces helper data and a binary hash sequence to generate suitable keys for secure communications. In the dictionary setup procedure, the measured analog response energy sequence from 460 repetitions is averaged together prior to binary conversion, whereas for data encryption a single-shot (not averaged) sequence is employed. Thus, for data encryption the key material is extracted at a rate of 0.27 Gbps.

To analyze the uniqueness and repeatability of the generated binary keys the fraction of positions in which the binary sequences differ (the "fractional Hamming distance," or FHD) is calculated between each individually generated key and the averaged keys used to generate the dictionary for all 22 devices. The histogram of FHDs between each individual binary key from each device and the averaged binary key from that same device forms the "same" distribution (FIG. 24A). The histogram of FHDs between each individual binary key from each device and the averaged binary key from each different device forms the "different" distribution. Likewise, the histogram of FHDs between each individual binary key from each device and the averaged binary key from each respective cloned device forms the "clone" distribution. The clear separation of these histograms demonstrates the distinguishability of binary keys from different devices and the small FHD of the "same" distribution demonstrates the robustness of extracting the binary key material at high speed from the physical device. A binomial probability mass function is fit to each histogram and is used to estimate the probability that a given PUF response will be beyond the error correction capabilities of the error correcting code (ECC) at a selected code rate, thus corrupting an entire block of data. The code rate is carefully selected to reduce the probability that a device of different design or a device clone could respond within the correctable range of the code to a negligible level.

In order to characterize the experimental BER of the communication system, 57 different pairs of unique photonic PUFs were synchronized and used to communicate a message of 25,575 bits in length. The recovered messages were compared to the transmitted messages to calculate the bit error rate (BER) at different BCH code rates (FIG. 24B). Error-free (mean BER < 10-5) communication is observed at code rates of 0.1 and below. Notably, at equivalent code rate (0.035) to previous approaches, an eight order of magnitude improvement is expected in operational BER.

One approach to eavesdrop on communications or maliciously send messages is for an adversary to obtain the cavity design and attempt to fabricate a clone of the device. However, the ray chaotic cavity design makes the device's behavior highly sensitive to structural variations arising from the fabrication process such as sidewall roughness, film thickness, resist granularity, and material impurities. To directly investigate this attack, two such clones of each device on the same chip were fabricated, thus maximizing consistency of fabrication conditions across devices, and compared the keys generated by legitimate and cloned devices. The probability that a cloned device could respond with sufficiently low error to be corrected to a legitimate response increases with lower code rates (FIG. 24B). Likewise, at lower rates, a BCH code can correct for more errors in the PUF response. Unfortunately, the code can also potentially correct for errors between responses from a cloned device and a legitimate device. At code rates of 0.1 error free communications are observed, this probability is on the order of 10-11, demonstrating the near impossibility of using a cloned device to eavesdrop or maliciously communicate.

Beyond cloning, an adversary could capture a device and try to fully characterize it. However, the nonlinearity of our devices protects against such an attack by greatly increasing the amount of information that an attacker would need to characterize. Specifically, in a linear system, the mapping from the system input to its output may be represented as a linear combination of its input symbols in the form of a transmission matrix whose uniqueness is limited by the number of orthogonal input vectors. If an adversary can observe and characterize this transmission matrix, and compute its inverse or pseudoinverse, they can obtain, exactly or approximately, any input given the output and vice-versa. In contrast, in a nonlinear system, the transmission function is a system of nonlinear relationships for which no such inversion exists. As the PUFs investigated here are nonlinear devices, this characterization would require probing with up to 2128 different challenges and recording the subsequent responses. With our 90-MHz repetition rate experimental laser source, that characterization would take up to 1023 years and would push the adversary towards other attacks. For example, the adversary could use the input pattern data stored in the public dictionary to reduce their search space. Provided the transport time is carefully monitored, a suitable number of patterns occupy the public dictionary, and patterns are chosen at random, this attack is sufficiently mitigated. Further, if access to the public dictionary is protected using a PUF authentication approach or equivalent public key architecture, then the adversary will have no advantage. Should the adversary record the encrypted communications channel and steal a key at a later date, they could attempt to decrypt previously sent messages. Additional protocol level enhancements applying ephemeral session keys could mitigate this attack.

While the BCH error correcting code and the SHA-256 hash algorithm were used in this demonstration, any suitable code and hash algorithm could be used instead. An adversary wishing to reverse the hash function itself would need to do so for each block; this is sufficiently difficult for the adversary to avoid this attack altogether. In order to verify the independence of generated keys, the entropy of 1000 privacy amplified keys is calculated as $(\mu^*(1-\mu))/\sigma^2$, where $\mu$ is the mean and $\sigma$ is the standard deviation of the FHD distribution of hashes yielding 256.1 bits. Based on this evaluation, the output strings of the proposed fuzzy extractor contain full entropy, as the length of these strings is 256 bits. Thus, the probability of guessing the true PUF response from the privacy amplified key would be 2-256 (i.e., an information theoretic security of 256 bits).

In conclusion, an encrypted communications scheme is shown that exploits key information extracted from a nonlinear photonic silicon micro-cavity PUF for secure communications. Compared to optical scattering based PUFs, this novel photonic PUF provides orders of magnitude improvement on channel BER and reductions in physical size while providing full compatibility with integrated circuits and telecommunications systems. Further, our approach makes use of fuzzy extraction that allows for full reconstruction of errors to the PUF response while enhancing privacy, thus allowing for the use of a variety of PUF designs for information theoretically secure communications. Given the growth of the size of the public dictionary, this method may find best application to the exchange of secure keys for modern cryptographic ciphers.

In another embodiment of the present invention, a PUF based on ultrafast nonlinear optical interactions in chaotic CMOS-compatible silicon microcavities is used. In addition to direct compatibility with planar semiconductor manufacturing and fiber optics, the photonic microcavity PUFs provide substantial advances in information content (key material) and information generation rates over OSPUFs. Further, the device's small size (~160 $\mu m^3$) enhances information density (storage of such key material in a small space). A chamfered cavity design is used (see FIG. 25A "Token") to produce chaotic behavior such that the device's output is extremely sensitive to the precise physical structure of the fabricated microcavity. This extreme sensitivity prevents direct duplication even with complete knowledge of the microcavity design and a maximally identical fabrication process. The protected key material stored in these devices can also be leveraged for encrypted communications. Here encrypted two-party communication is demonstrated by exploiting physically protected key material from two photonic microcavity PUFs.

FIG. 25A illustrates a schematic view of photonic PUF with time-stretched fuzzy extraction. Inset. SEM image. FIG. 25B illustrates a graphical view of a frequency response from un-patterned pulse via optical spectrum analyzer. Only ~1.5 THz of bandwidth is extracted. FIG. 25C illustrates a graphical response of the same response measured by time-stretched detection.

The key extraction hardware system operates by spectrally encoding a periodic stream of ultrashort optical pulses from a mode-locked laser (MLL) with symbols from a pseudorandom binary sequence (PRBS) (FIG. 25A) such that every laser pulse has a unique pseudorandom spectral amplitude code. These pulses are coupled into the input waveguide of the microcavity and subsequently excite a large number of transient spatial optical modes within the cavity that interact with the precise physical structure of the cavity and with each other via the optical nonlinearities of silicon. Notably, this nonlinearity greatly increases the total information content of the devices. Throughout the interaction with the cavity, light couples from the cavity into the output waveguide. This light is then coupled to a single-mode optical fiber and the resulting spectrum of each laser pulse is measured in real-time using a dispersive Fourier transform. Specifically, by sending the cavity response through a 50-km dispersion compensating module, the response spectrum is mapped to the time-domain where it is photodetected and digitized using a real-time oscilloscope. Binary key sequences are then generated from these response waveforms.

Figure 26:
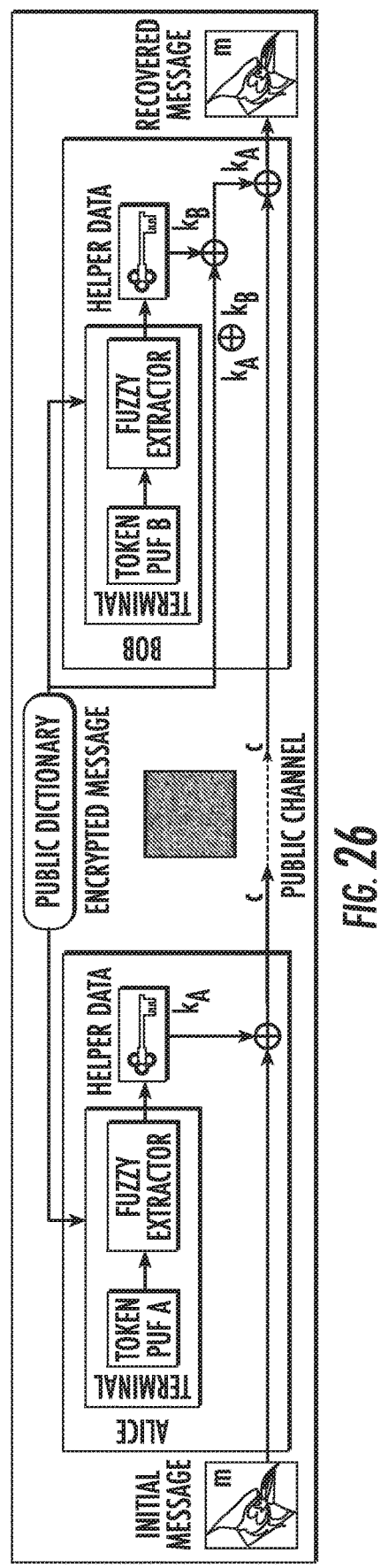
FIG. 26 illustrates a schematic view of a principle of two-party encrypted communications using two photonic PUFs.
Figure 27C:
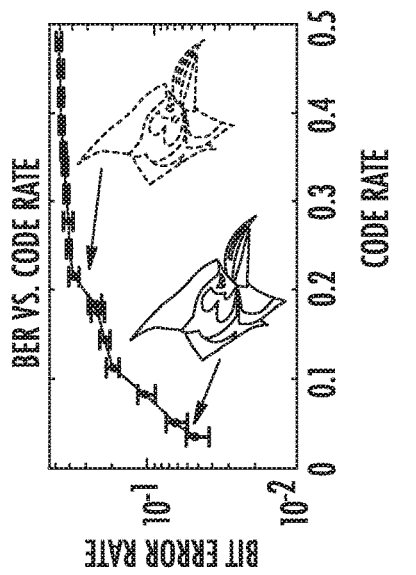
FIG. 27C illustrates a graphical view for a fuzzy communication bit error rate (BER) versus code rate (20 repetitions).
Figure 27B:
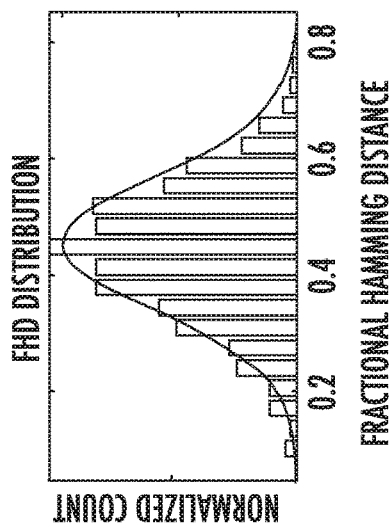
FIG. 27B illustrates a graphical view of a binary response correlation result.
Figure 27A:
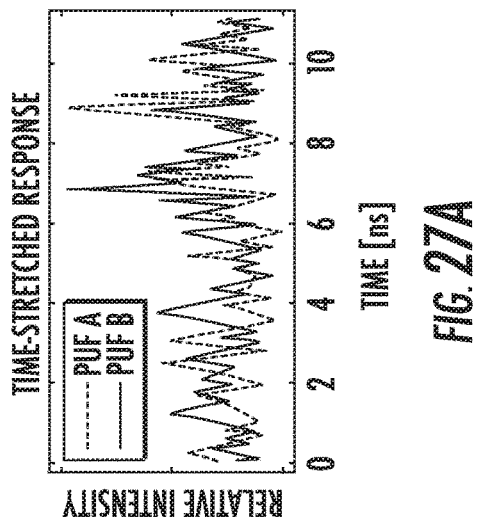
FIG. 27A illustrates a graphical view of a typical time-stretched cavity response bound for two photonic PUFs to the same input with signal-to-noise ratio of ~18.6.

FIG. 26 illustrates a schematic view of a principle of two-party encrypted communications using two photonic PUFs. To evaluate the encryption performance, the binary response sequence is decomposed into blocks of 255 bits and apply the fuzzy extractor to produce helper data and binary hash sequences. A 100-kbit message is then decrypted and encrypted (FIG. 26) at different code rates and measure the channel bit error rate (FIG. 27C). The results indicate that with code rates of 0.04, a channel bit error rate as low as 0.038 can be achieved. This novel technique provides a robust mechanism for harnessing information from photonic PUFs for security applications. FIG. 27A illustrates a graphical view of a typical time-stretched cavity response bound for two photonic PUFs to the same input with signal-to-noise ratio of ~18.6. FIG. 27B illustrates a graphical view of a binary response correlation result. FIG. 27C illustrates a graphical view for a fuzzy communication bit error rate (BER) versus code rate (20 repetitions).

Figure 28:
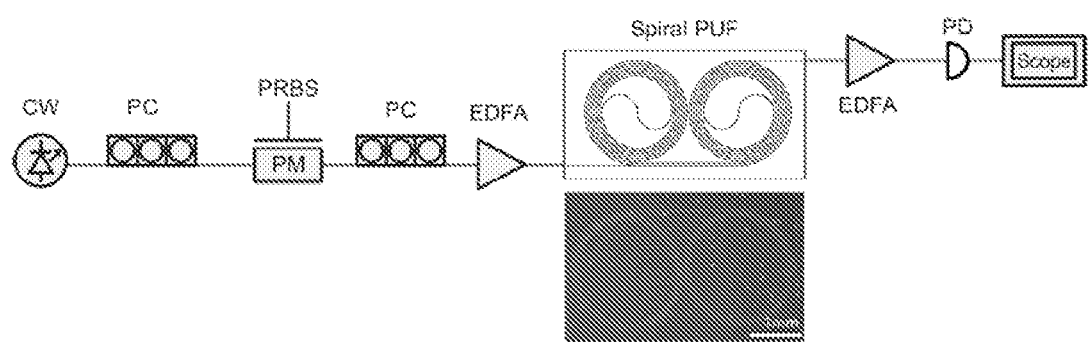
FIG. 28 illustrates a schematic view of an experimental setup of authentication system. The inset is the microscope image of the device.

In yet another embodiment of the present invention, an integrated photonic PUF using an on-chip silicon nitride (SiN) is evanescently coupled multimode spiral cavity. Silicon spiral waveguides have been used as on-chip optical spectrometers in the past. These multimode waveguides produce complex spectral responses due to the interference between the fields that travel different path lengths. The designed spiral structure will introduce evanescent coupling between adjacent waveguides in the spiral due to the small gap designed between them, which will further enrich the complexity of the response. Furthermore, the low loss in the SiN compared with Si waveguides allows us to produce devices with an order of magnitude longer photon lifetime than our previously mentioned Si PUFs. Consequently, these SiN devices benefit from a greater number of spectrotemporal features and thus offer more information storage capacity. As shown in FIG. 28, the proposed SiN PUF is constructed by two long, evanescently coupled spiral waveguides. FIG. 28 illustrates a schematic view of an experimental setup of authentication system. The inset is the microscope image of the device.

Figure 29C:
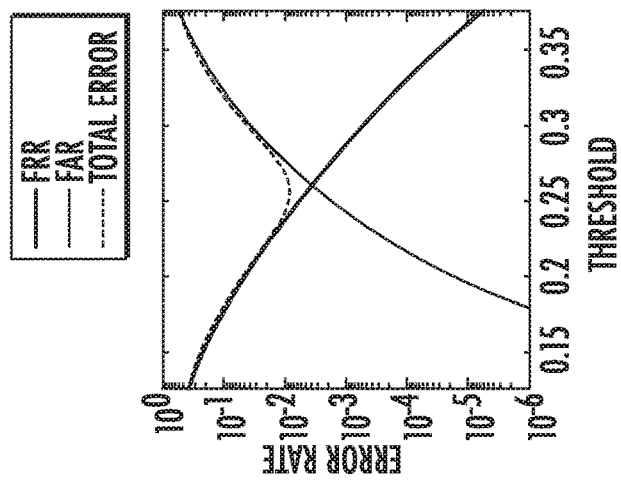
FIG. 29C illustrates a graphical view of the FRR and FAR curve versus threshold.
Figure 29B:
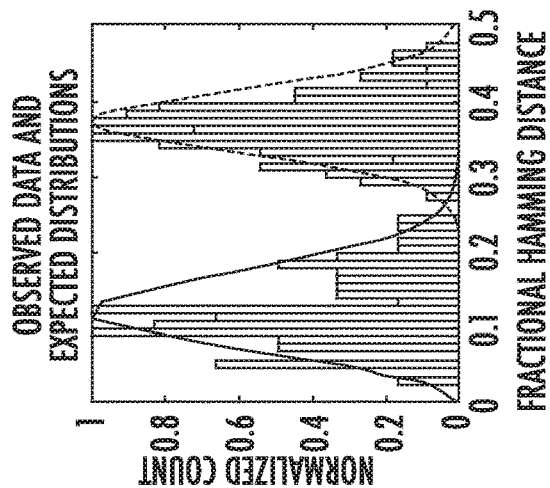
FIG. 29B illustrates a graphical view of a FHD binomial distribution and histograms for binary responses from original device and the identical copy.
Figure 29A:
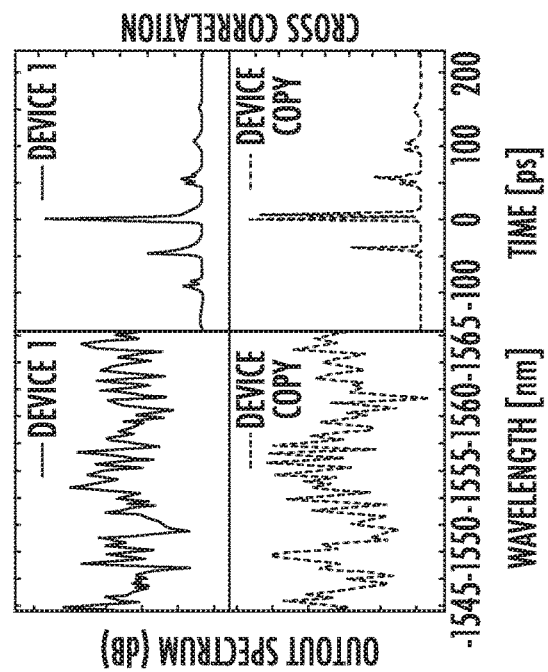
FIG. 29A illustrates a graphical view of a spectral transfer function (left) and time-domain response (right) for original device (top) and identical copy (bottom), respectively.

The devices are fabricated using standard microelectronics fabrication techniques in CNST's NanoFab at NIST. A 730-nm thick silicon nitride film is deposited using LPCVD, and patterned by optical stepper lithography. After RIE etching, the device is annealed at 1000° C. and cladded by LPCVD deposited silicon dioxide. The width of the waveguide in spiral cavity is designed to be 18 µm, and the smallest bending radius in this device is 500 µm, which can support as many as 32 transverse electric (TE) modes according to the simulation results by FIMMWAVE software. The gap between the adjacent waveguides in the spiral is designed to be 2 µm thereby enabling evanescent coupling between adjacent waveguides of the various TE modes, and the total length of the cavity is 105 mm. FIG. 29A illustrates the output spectrum and the cross correlation of an ultrashort pulse coupled through two fabricated devices that are designed to be the same. These results were obtained by passing transform-limited, 200 fs laser pulses through two ideally identical devices which were fabricated on the same substrate. As is shown, despite identical design each device exhibits distinct behavior due to slight fabrication variations (e.g. precise coupling coefficient vs. position, scattering from sidewall roughness, etc.), which can serve as a fingerprint of the device. FIG. 29A illustrates a graphical view of a spectral transfer function (left) and time-domain response (right) for original device (top) and identical copy (bottom), respectively. FIG. 29B illustrates a graphical view of a FHD binomial distribution and histograms for binary responses from original device and the identical copy. FIG. 29C illustrates a graphical view of the FRR and FAR curve versus threshold.

In order to validate the use of these devices as a secure unclonable key in an authentication scenario the experimental setup shown in FIG. 28. A continuous wave (CW) laser is phase modulated (PM) with an 8000 bit pseudorandom binary sequence (PRBS) at 10 Gbit/s generated by a pulse pattern generator. The patterned signal is then amplified and coupled into the chip. Essentially, the PUF behaves as a multi-tap interferometer, which demodulates the PM signal while imprinting unique temporal features on the output. Note that this operation is the direct temporal analogue of speckle generation in a spatial scattering PUF. The output temporal waveform (response) is detected using a 45-GHz photodetector on a sampling oscilloscope. A challenge response library (CRL) is created by averaging the output response over 20 repetitions. The post processing algorithm is used in order to compare a single response against the CRL. Authentication is performed by calculating the fractional hamming distance (FHD) between the device and the CRL. FIG. 29B shows the normalized histogram plots of the FHD for 8000 challenge/response pairs. The left histogram corresponds to the FHD for the correct device, and the right histogram is the calculated FHD between a device and a CRL generated for a physically identical copy. The separation between the two histograms confirms that the devices are not clonable as even this maximally identical copy is clearly distinguishable. Furthermore, the small standard deviation suggests good repeatability in response to challenges. In FIG. 29C, a binominal distribution fit is used in order to calculate the false acceptance rate (FAR) and false rejection rate (FRR) of the key. From FIG. 29C, an error rate for 184-bits long sequence is as low as 10-2 if the threshold is chosen at 0.25.

Although the foregoing description contains many specifics, these should not be construed as limiting the scope of the present disclosure, but merely as providing illustrations of some of the presently preferred implementations. Similarly, other implementations of the invention may be devised which do not depart from the spirit or scope of the present invention. Features from different implementations may be employed in combination. The scope of the invention is, therefore, indicated and limited only by the appended claims and their legal equivalents, rather than by the foregoing description. All additions, deletions, and modifications to the invention as disclosed herein, which fall within the meaning and scope of the claims, are to be embraced thereby.

As used herein, an element or step recited in the singular and proceeded with the word "a" or "an" should be understood as not excluding plural elements or steps, unless such exclusion is explicitly recited. Furthermore, references to "one implementation" of the present invention are not intended to be interpreted as excluding the existence of additional implementations that also incorporate the recited features This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It should be noted that the methods of the present invention described above can be implemented with a computing device. The computing device can be hard wired to the imaging machine or can be networked in a wired or wireless manner. The computing device can also communicate with a server or other remote computing device in order to execute these steps. A non-transitory computer readable medium programmed to execute the methods can be loaded on the computing device or in communication with the computing device. The non-transitory computer readable medium can take any suitable form known to one of skill in the art. The non-transitory computer readable medium is understood to be any article of manufacture readable by a computer or other computing device. Such non-transitory computer readable media includes, but is not limited to, magnetic media, such as floppy disk, flexible disk, hard, disk, reel-to-reel tape, cartridge tape, cassette tapes, non-volatile memory, or cards, optical media such as CD-ROM, DVD, blu-ray, writable compact discs, magneto-optical media in disc, tape, or card form, and paper media such as punch cards or paper tape. Alternately, the program for executing the method and algorithms of the present invention can reside on a remote server or other networked device. The computing device can take the form of a PC, tablet, smartphone, processor, microcontroller, or any other suitable computing device known to or conceivable by one of skill in the art.

The program can also exist on a specially designed computer built with the specifications of the present invention in mind. The computing device is also configured to receive power or capacitance from outside sources.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A system for a cryptographic primitive which is deployable in a cryptographic system comprising:
    an authentication token wherein the authentication token physically defines a resonator cavity;
    an authentication terminal wherein the authentication terminal submits challenge pulses to the authentication token and records a response to each of the challenge pulses, and wherein the authentication terminal verifies the response with an expected response; and,
    wherein the system leverages the chaotic behavior of integrated photonic cavities to create a repeatable output, is constructed on a silicon wafer, is of shape and form that creates nonlinear behavior with optical input, has one or more over-coupled or evanescently coupled bus waveguides for transmission and emission and responds to high-power illumination in a way that leverages the nonlinear behavior within the resonator cavity of the device which contribute to the output.

2. The system of claim 1, wherein the challenge pulses can be compressed and spectrally phase encoded and high power to operate within the nonlinear behavior of the resonator cavity.

3. The system of claim 1, wherein the authentication terminal is comprised of a highly non-linear fiber.

4. The system of claim 1, wherein a polarization state may be used as a factor in developing challenge response pairs.

5. The system of claim 1, wherein a latency of an optical response is used in the verification process.

6. The system of claim 1 wherein the response to a challenge to the resonator cavity are amplified and looped back into the input of the resonator cavity zero or more times.

7. The system of claim 1, wherein an A/D detection process interpolates sampled responses with a cubic filter and uses a peak finding algorithm to identify response locations, uses an optimization algorithm to determine an ideal integration window about the peak point to maximize SNR calculates integrated power measurements based upon the ideal integration window calculates the Probability Density Function (PDF) of sampled integrated powers and requantized points into non-uniform levels which flatten a resultant PDF selects k Least Significant Bits (LSBs) from each sample appends resultant bits into a single bit stream.

8. The system of claim 1 further comprising a reverberant silicon photonic cavity.

9. The system of claim 1 further comprising a spectral filter.

10. A method for a cryptographic primitive which is deployable in a cryptographic system comprising:
    submitting challenge pulses to an authentication token wherein the authentication token physically defines a resonator cavity and wherein the challenge pulses are submitted using an authentication terminal;
    recording a response to the challenge pulses;
    verifying the response to the challenge pulses by comparing the response to an expected response; and
    using an A/D detection process interpolating sampled responses with a cubic filter and uses a peak finding algorithm to identify response locations, using an optimization algorithm to determine an ideal integration window about a peak point to maximize SNR calculates integrated power measurements based upon the ideal integration window calculates a Probability Density Function (PDF) of the sampled integrated powers and requantized points into non-uniform levels which flatten a resultant PDF selects k Least Significant Bits (LSBs) from each sample appends the resultant bits into a single bit stream.

11. The method of claim 10, further comprising leveraging chaotic behavior of integrated photonic cavities to create a repeatable output.

12. The method of claim 10 further comprising responding to high-power illumination in a way that leverages nonlinear effects within a device which contribute to the output.

13. The method of claim 10 further comprising compressing the challenge pulses, wherein the challenge pulses are spectrally phase and/or amplitude encoded and high power to operate within nonlinear behavior of the resonator cavity wherein the system leverages the chaotic behavior of integrated photonic cavities to create a repeatable output, is constructed on a silicon wafer, is of shape and form that creates the nonlinear behavior with optical input.

14. The method of claim 10, further comprising using a highly non-linear fiber.

15. The method of claim 10, further comprising using a polarization state as a factor in developing challenge response pairs.

16. The method of claim 10, further comprising using an optical response in the verification process.

17. The method of claim 10 further comprising amplifying and looping back the response to a challenge to the resonator cavity into an input of the resonator cavity zero or more times.

18. The method of claim 10 further comprising using a spectral filter.

19. A system for a cryptographic primitive which is deployable in a cryptographic system comprising:
    an authentication token wherein the authentication token physically defines a resonator cavity;
    an authentication terminal wherein the authentication terminal submits challenge pulses to the authentication token and records a response to each of the challenge pulses,
    wherein the authentication terminal verifies the response with an expected response; and
    wherein an A/D detection process interpolates sampled responses with a cubic filter and uses a peak finding algorithm to identify response locations, uses an optimization algorithm to determine an ideal integration window about the peak point to maximize SNR calculates integrated power measurements based upon the ideal integration window calculates the Probability Density Function (PDF) of sampled integrated powers and re-quantized points into non-uniform levels which flatten a resultant PDF selects k Least Significant Bits (LSBs) from each sample appends resultant bits into a single bit stream.

* * * * *